(12) United States Patent
Karagianni et al.

(10) Patent No.: US 8,163,100 B2
(45) Date of Patent: *Apr. 24, 2012

(54) SYNTHETIC MICROGEL POLYMER COMPOSITIONS FOR TREATING AND/OR MODIFYING HARD SURFACES

(75) Inventors: Katerina Karagianni, Paris (FR); Claire Pitois, Osny (FR)

(73) Assignee: Rhodia Operations, Aubervilliers (FR)

( * ) Notice: Subject to any disclaimer, the term of this patent is extended or adjusted under 35 U.S.C. 154(b) by 508 days.

This patent is subject to a terminal disclaimer.

(21) Appl. No.: 12/086,892

(22) PCT Filed: Dec. 12, 2006

(86) PCT No.: PCT/EP2006/069581
§ 371 (c)(1),
(2), (4) Date: Jul. 2, 2009

(87) PCT Pub. No.: WO2007/071591
PCT Pub. Date: Jun. 28, 2007

(65) Prior Publication Data
US 2010/0004152 A1     Jan. 7, 2010

(30) Foreign Application Priority Data
Dec. 20, 2005   (FR) ...................... 05 12949

(51) Int. Cl.
*B08B 3/04* (2006.01)
*C11D 3/37* (2006.01)

(52) U.S. Cl. .......... 134/25.2; 134/25.3; 134/39; 134/42; 510/475; 525/261; 525/299; 525/301; 525/302; 525/303; 525/309; 528/271; 528/363; 528/364; 528/369; 528/370; 528/374; 528/376; 528/422

(58) Field of Classification Search ........... 510/475; 134/25.2, 25.3, 39, 42; 525/261, 299, 301, 525/302, 303, 309; 528/271, 363, 364, 369, 528/370, 374, 376, 422
See application file for complete search history.

(56) References Cited

U.S. PATENT DOCUMENTS

| | | | |
|---|---|---|---|
| 6,201,099 B1* | 3/2001 | Petersen et al. | 528/376 |
| 6,336,966 B1* | 1/2002 | Coca et al. | 106/499 |
| 6,924,260 B2 | 8/2005 | Aubay | |
| 7,884,056 B2* | 2/2011 | Bendejacq et al. | 507/219 |
| 2008/0114128 A1 | 5/2008 | Destarac et al. | |

FOREIGN PATENT DOCUMENTS

| | | | |
|---|---|---|---|
| FR | 2796390 A1 | | 1/2001 |
| FR | 2853324 A1 | | 10/2004 |
| FR | 2870245 A1 | | 11/2005 |
| WO | WO 00/02939 | * | 1/2000 |
| WO | WO 00/02939 A1 | | 1/2000 |

* cited by examiner

*Primary Examiner* — Brian P Mruk
(74) *Attorney, Agent, or Firm* — SNR Denton US LLP

(57) ABSTRACT

Synthetic microgel polymer compositions are useful for treating and/or modifying hard surfaces, in particular by promoting the hydrophilization thereof, notably in cleaning or rinsing operations.

48 Claims, 1 Drawing Sheet

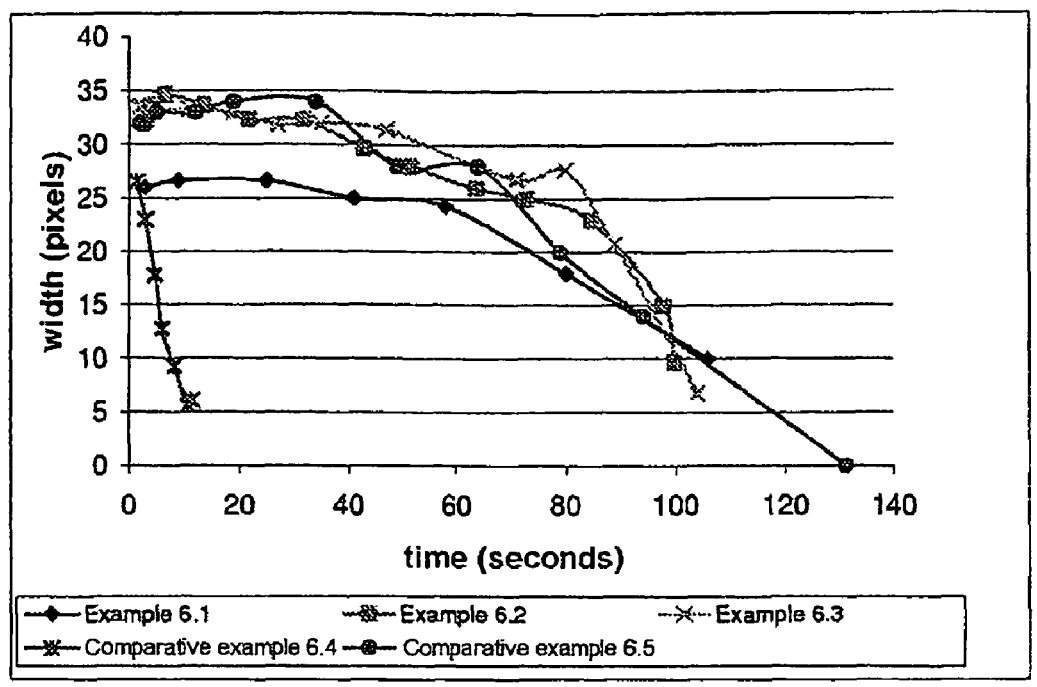

SYNTHETIC MICROGEL POLYMER COMPOSITIONS FOR TREATING AND/OR MODIFYING HARD SURFACES

CROSS-REFERENCE TO PRIORITY/PCT APPLICATIONS

This application claims priority under 35 U.S.C. §119 of FR 0512949, filed Dec. 20, 2005, and is a national phase of PCT/EP 2006/069581, filed Dec. 12, 2006 and designating the United States (published in the French language on Jan. 28, 2007, as WO 2007/071591; the title and abstract were also published in English), each hereby expressly incorporated by reference in its entirety and each assigned to the assignee hereof.

One subject of the present invention is a composition for treating and/or modifying hard surfaces, containing a synthetic polymer of microgel type.

One subject matter of the present invention is in particular a cleaning or rinsing composition intended for the treatment of industrial, domestic or communal hard surfaces, in particular of ceramic, tiling, window, metal, melamine, formica or plastic type, targeted at conferring on the latter in particular persistent antideposition and/or antiadhesion properties with regard to soiling substances; in addition, it can contribute antistatic, gloss or slip-resistance properties to the latter.

One subject matter of the invention is more particularly a cleaning or rinsing composition intended for the treatment of a hard surface, which composition is capable of conferring, on the latter, persistent hydrophilic antideposition and/or antiadhesion properties with regard to soiling substances, so as to prevent the subsequent presence of marks due in particular:

to the drying of drops of water deposited on said surface (for example deposit of inorganic salts)
to the attachment of inorganic or organic particles present in the surrounding air (case of the cleaning of skyscrapers) or deposited by contact (case of the cleaning of floors, toilets, and the like)
to the deposition by spattering of fatty organic compounds (cooking fats)
to the deposition of soaps and their metal salts
to the deposition of compounds of vegetable origin of hydrocolloid or polysaccharide type.

Commercial detergent formulations make it possible to efficiently clean industrial, domestic or communal hard surfaces. They are generally composed of an aqueous solution of surfactants, in particular of nonionic and anionic or nonionic and cationic surfactants, of solvents, of alcohol(s), in order to facilitate drying, and optionally of sequestering agents and of bases or acids, in order to adjust the pH. A frequent disadvantage of these detergent formulations is that the subsequent contact of the hard surface with water results, during drying, in the formation of marks. In addition, the treatment with these formulations is only, for the majority of them, purely curative and not preventative. Thus, industrial or domestic cleaners are effective in cleaning the soiled hard surface but do not make it possible to prevent or limit the future fouling thereof or even to promote the subsequent cleaning thereof.

For treating and/or modifying hard surfaces, especially for cleaning hard surfaces, it is known to use compositions containing synthetic polymers.

It has thus been proposed to use linear polymers or copolymers to hydrophilize the hard surfaces, for example copolymers that derive from cationic monomers of acrylic acid and optionally of other monomers such as acrylamide. Such applications and such compositions are especially described in documents EP-A-1 196 527, EP-A-1 196 528 and EP-A-1 196 523.

However, there is a need for novel compositions for treating and/or modifying surfaces and/or for novel uses of synthetic polymers, in particular in order to provide better performing compositions for certain functions, and/or compositions that have novel properties, and/or less expensive compositions, and/or compositions that comprise smaller amounts of active material.

The present invention meets at least one of the needs expressed above, by providing a composition for treating and/or modifying hard surfaces, comprising a synthetic polymer, characterized in that the polymer is a microgel comprising:

a chemically crosslinked polymeric core comprising units C that derive from a core monomer C and crosslinking units R that derive from a crosslinking monomer R; and
optionally macromolecular branches at the periphery of the core.

The present invention also relates to the use of the microgel in a composition for treating and/or modifying hard surfaces, especially in a composition for cleaning or rinsing hard surfaces.

In particular, the microgel may contribute to:
the hydrophilization of hard surfaces;
facilitating the cleaning of hard surfaces; and/or
facilitating the following cleaning of hard surfaces.

Thus the microgel may especially provide antideposition and/or antiadhesion properties with regard to soiling substances capable of being deposited on said surfaces.

The treatment and/or modification may especially confer persistent properties on the hard surfaces.

Definitions

In the present application, the term "microgel" is understood to mean a macromolecular, copolymer compound comprising a core and optionally, at the periphery of the core, macromolecular branches bonded to the core. These are architectures that are more or less complex, which are known to persons skilled in the art. The words "star copolymer" are sometimes used to denote microgels comprising macromolecular branches at the periphery of the core. The terms "star copolymer" and "microgel" partially overlap, the common parts being the compounds comprising a chemically crosslinked polymeric core comprising macromolecular branches at the periphery. In the present application, the term "arms" is also used instead of "branches" and covers the same idea. The number of branches is generally linked to the nature of the core and/or to the process for preparing the microgel.

In the present application, the term "Core C" denotes a microgel comprising a chemically crosslinked polymeric core but that does not comprise macromolecular branches at the periphery of the core. Such cores C may be obtained by copolymerization of a core monomer C having a single polymerizable group and a crosslinking monomer R that has at least two polymerizable groups (crosslinking monomer), in the absence of surfactant, or in the presence of a small amount of surfactant (for example, less than 10% by weight, preferably less than 5% by weight, or even less than 1% by weight). They are especially distinguished in this way from "nanolatices", polymers that are obtained by emulsion polymerization in the presence of large amounts of surfactants at or close to thermodynamic equilibrium. The nanolatices are polymers that have behavior different from the cores C during introduction into an aqueous composition.

In the present application, the term "C-branches" denotes a microgel comprising a chemically crosslinked polymeric core and macromolecular branches at the periphery of the core. Such a microgel may especially be prepared by a process of the "arm first" type or by a process of the "core first" type. In the latter case, the microgel may be obtained by growth of macromolecular branches at the periphery of a core C as defined below. Processes and microgels are given in detail later on. The C-branches microgels are different from nanolatices, especially by the presence of macromolecular branches.

In the present application, the expression "unit that derives from a monomer" denotes a unit which may be obtained directly from said monomer by polymerization. Thus, for example, a unit that derives from an acrylic or methacrylic acid ester does not cover a unit of formula —$CH_2$—CH(COOH)—, —$CH_2$—C($CH_3$)(COOH)—, —$CH_2$—CH(OH)—, respectively, obtained for example by polymerizing an acrylic or methacrylic acid ester or a vinyl acetate ester, respectively, then by hydrolyzing it. A unit that derives from acrylic or methacrylic acid covers, for example, a unit obtained by polymerizing a monomer (for example, an acrylic or methacrylic acid ester), then by making the polymer obtained react (for example, by hydrolysis) so as to obtain units of formula —$CH_2$—CH(COOH)—, or —$CH_2$—C($CH_3$)(COOH)—. A unit that derives from a vinyl alcohol covers, for example, a unit obtained by polymerizing a monomer (for example, a vinyl ester), then by making the polymer obtained react (for example, by hydrolysis) so as to obtain units of formula —$CH_2$—CH(OH)—.

Typically, the theoretical average molecular weight $M_{block}$ or $M_{branch}$ of a block or of a branch (in the case of a Mikto-type microgel) is calculated according to the following formula:

$$M_{block\ or\ branch} = \sum_i M_i * \frac{n_i}{n_{precursor}}$$

where $M_i$ is the molecular weight of a monomer i, $n_i$ is the number of mols of the monomer i, $n_{precursor}$ is the number of mols of functional groups to which the macromolecular chain of the block or of the branch will be bonded. The functional groups may originate from a transfer agent (or a transfer group) or an initiator, a previous block, a core, etc. If this is a previous block or a core, the number of mols may be considered to be the number of mols of a compound to which the macromolecular chain of said previous block or core has been bonded, for example a transfer agent (or a transfer group) or an initiator.

The measured molecular weights of branches are number-average molecular weights, measured by size exclusion chromatography (SEC), before assembly of the branches to a core, or before formation of a core.

The measured molecular weights of a block are number-average molecular weights, measured by size exclusion chromatography (SEC), after formation of the block, from which the measured molecular weight of a previously formed block is optionally subtracted.

The theoretical coefficient for generation of branches is given by the formula $r=n_{Rdifunct}/n_{precursor}$, where $n_{Rdifunct}$ is the number of moles of a diethylenically unsaturated crosslinking monomer $R_{difunct}$. The higher this coefficient is, in the case of C-branch microgels, the greater the number of branches. It is mentioned that the actual number of branches of the microgel is not generally equal to this coefficient. It is mentioned that this coefficient is generally adjusted as a function of the process for preparing the microgel: for an identical actual or measured number of branches, it is generally for a "core first" type process than for an "arm first" type process.

The measured molecular weight of a microgel $M_{star}$ is a weight-average molecular weight measured by static light scattering experiments, using Zimm plots.

The measured number of branches $n_{arm}$ for a copolymer having a crosslinked polymeric organic core is given by the formula: $M_{star}=M_W \times n_{arm}$ where $M_W$ is the weight-average molecular weight measured by the static light scattering experiments, using Zimm plots, on a block copolymer obtained in the same manner as the star copolymer, but without the use of a crosslinking monomer R.

In the present application, the term "hydrophobic" is used in its normal meaning of "having no affinity for water"; this means that the organic polymer of which it is composed, taken alone (having the same composition and the same molecular weight), would form a macroscopic two-phase solution in distilled water at 25° C., at a concentration greater than 1% by weight.

In the present application, the term "hydrophilic" is also used in its normal meaning of "having an affinity for water", that is to say is not capable of forming a macroscopic two-phase solution in distilled water at 25° C., at a concentration greater than 1% by weight.

In the present application, the hydrophilicity (respectively hydrophobicity) of a block or of a branch refers to the hydrophilic quality that a macromolecular chain of the same composition and of the same molecular weight as the block or branch would have without being bonded to the core and/or to other blocks.

The expression "cationic or potentially cationic units" is understood to mean units which comprise a cationic or potentially cationic group. The cationic units or groups are units or groups that have at least one positive charge (generally combined with one or more anions such as the chloride ion, bromide ion, sulfate group or methyl sulfate group), regardless of the pH of the medium into which the microgel is introduced. The potentially cationic units or groups are units or groups which may be neutral or have at least one positive charge depending on the pH of the medium into which the microgel is introduced. In this case they are referred to as potentially cationic units in neutral form or in cationic form. By extension, it is possible to refer to cationic or potentially cationic monomers.

The expression "anionic or potentially anionic units" is understood to mean units that comprise an anionic or potentially anionic group. The anionic units or groups are units or groups that have at least one negative charge (generally combined with one or more cations such as cations of alkali metal or alkaline-earth metal compounds, for example sodium, or with one or more cationic compounds such as ammonium), regardless of the pH of the medium in which the microgel is present. The potentially anionic units or groups are units or groups that may be neutral or have at least one negative charge depending on the pH of the medium in which the microgel is present. In this case, they are known as potentially anionic units in neutral form or in anionic form. By extension, it is possible to refer to anionic or potentially anionic monomers.

The expression "neutral units" is understood to mean units that have no charge, regardless of the pH of the medium in which the microgel is present.

The term "persistent antideposition and/or antiadhesion properties" is understood to mean that the treated surface retains these properties over time, including after subsequent contacts with a soiling substance (for example rainwater, water from the distribution network, rinsing water to which rinsing products have or have not been added, spattered fats, soaps, and the like) This property of persistence can be observed beyond approximately 10 rinsing cycles, indeed even, in some specific cases where numerous rinsings are carried out (case of toilets, for example), beyond 100 rinsing cycles.

The above expression of "conferring, on the surface thus treated, antideposition properties" means more particularly that the treated surface, brought into contact with a soiling substance in a predominantly aqueous medium, will not have a tendency to "capture" said soiling substance, which thus significantly reduces the deposition of the soiling substance on the surface.

The above expression of "conferring, on the surface thus treated, antiadhesion properties" means more particularly that the treated surface is capable of interacting only very slightly with the soiling substance which has been deposited thereon, which makes possible easy removal of the soiling substances from the soiled treated surface; this is because, during the drying of the soiling substance brought into contact with the treated surface, the bonds developed between the soiling substance and the surface are very weak; thus, to break these bonds requires less energy (thus less effort) during the cleaning operation.

When it is said that the presence of the microgel makes it possible "to improve the cleaning ability" of a formulation, this means that, for the same amount of cleaning formulation (in particular a formulation for washing dishes by hand), the formulation comprising the microgel makes it possible to clean a greater number of soiled objects than a formulation which is devoid thereof.

In addition, the deposition on a hard surface of the microgel makes it possible to contribute antistatic properties to this surface; this property is particularly advantageous in the case of synthetic surfaces.

The presence of the microgel in formulations for the treatment of a hard surface makes it possible to render the surface hydrophilic or to improve its hydrophilicity.

The property of hydrophilization of the surface makes it possible in addition to reduce the formation of condensation on the surface; this advantage can be made use of in cleaning formulations for windows and mirrors, in particular in bathrooms. Furthermore, the rate of drying of the surface, immediately after treatment thereof by the application of the polymer but also after subsequent and repeated contacts with an aqueous medium, is very significantly improved.

The term "hard surfaces" is to be taken in the broad sense; it refers to nontextile surfaces which can equally well be domestic, communal or industrial surfaces.

They can be made of any material, in particular of the following types:
  ceramic (surfaces such as bathroom sinks, bath tubs, wall or floor tiles, toilet bowls and the like),
  glass (surfaces such as interior or exterior windows of buildings or of vehicles, or mirrors),
  metal (surfaces such as internal or external walls of reactors, blades, panels, pipes, and the like),
  synthetic resins (for example bodywork or interior surfaces of motorized vehicles (automobiles, trucks, buses, trains, planes, and the like), melamine or formica surfaces for the interior of offices, kitchens, and the like),
  plastics (for example poly(vinyl chloride) or polyamide, for the interior of vehicles, in particular automobiles).

The "hard surfaces" according to the invention are surfaces which are not very porous and which are non-fibrillar; they are thus to be distinguished from textile surfaces (fabrics, fitted carpets, clothes, and the like, made of natural, artificial or synthetic materials).

Given below are some details regarding the microgels for the invention, some of their features and processes used for their preparation, then regarding the compositions themselves.

Microgel

Given below are details regarding the microgels for the invention, and the processes used for their preparation.

The microgel comprises:
  a chemically crosslinked polymeric core comprising units C that derive from a core monomer C and crosslinking units R that derive from a crosslinking monomer R; and
  optionally macromolecular branches at the periphery of the core.

In the case where the microgel does not comprise macromolecular branches at the periphery of the core, the microgel is in reality a simple microgel, that does not have a star architecture, denoted by "core C". Details are given in the section "Core C" below.

In the case where the microgel comprises macromolecular branches at the periphery of the core, the microgel has a star architecture (having a chemically crosslinked polymeric core), denoted by "C-branches". Details are given in the section "C-branches" below.

In both cases, the microgel is preferably capable of being obtained by a process using a controlled radical polymerization process, as explained later on.

The microgel may especially be different from a star copolymer (C-branches$_{block}$ microgel) comprising a core C and, at the periphery of the core, macromolecular branches that each comprise:
  an intermediate block A bonded to the core or at least partly included in the core; and
  a peripheral block B linked to the block A;
  the blocks A and B being such that:
    the block A is hydrophilic and the block B is hydrophobic; or
    the block A is hydrophilic and the block B is hydrophilic and cationic or potentially cationic.

Core C

The core C is a chemically crosslinked copolymer capable of being obtained by polymerization, preferably by controlled radical polymerization, of a blend of monomers comprising:
  at least one core monomer C comprising a single polymerizable group, preferably a monoethylenically unsaturated monomer; and
  at least one crosslinking monomer R comprising at least two polymerizable groups, preferably a multiethylenically unsaturated monomer.

According to one particular embodiment, the molar ratio of the core monomer C to the crosslinking monomer R is greater than or equal to 1.

According to one particular embodiment:
  the core C is obtained by controlled radical polymerization using a "precursor" control or transfer agent, in the presence of a source of free radicals;
  the crosslinking monomer R is a diethylenically unsaturated monomer $R_{difunct}$; and
  the theoretical coefficient for generation of branches r is greater than or equal to 0.25.

It is mentioned that the preparation of a core C may correspond to the first step (step a)) of a process for preparing a C-branches microgel by an "arm first" type process. Such a process is explained in detail later on.

Thus, the core C comprises:
  core units C which may derive from the core monomer C; and crosslinking units R which may derive from the crosslinking monomer R.

Of course, it is not excluded that the units C and the monomers C comprise several different units or derive from several different monomers.

C-Branches Microgel

The architectures of C-branches microgels are known. Architectures which may be used, and also useful processes, are especially described in documents WO 99/58588, EP 1123332, WO 2004/014535, WO 2005/116097.

Thus the C-branches microgel may be chosen from the following microgels:

C-branches$_{Homo}$, where each branch is of identical chemical nature, comprising at least 90 mol % of identical units;

C-branches$_{block}$, where each branch is of identical chemical nature, each comprising at least one block A comprising units A and at least one block B comprising units B, the block B being different from the block A;

C-branches$_{rand}$, where each branch is of identical chemical nature, each comprising less than 90 mol % of units A and less than 90 mol % of units B different from units A, distributed randomly or in a gradient; and C-branches$_{MIKTO}$, comprising at least one branch A comprising units A, and at least one branch B comprising B units different from units A, the branch A and the branch B being of different chemical natures.

In the case where the microgel is a C-branches$_{block}$ microgel, the block A is by convention defined as being an intermediate block connected to the core, and the block B is by convention defined as a peripheral block connected to the block A.

The macromolecular branches at the periphery of the core are linked to the core, by units A and/or B for the C-branches$_{Homo}$, C-branches$_{rand}$ or C-branches$_{MIKTO}$ microgels, by units A of the block A, for the C-branches$_{block}$ microgels. The macromolecular branches at the periphery of the core may constitute at least one part of the core. The units A and/or B for the C-branches$_{Homo}$, C-branches$_{rand}$ or C-branches$_{MIKTO}$ microgels or the block A for the C-branches$_{block}$ microgels are in this case at least partly included in the core. That amounts to saying that the core C may comprise, as core units C, units identical to those of the branches: units A and/or B for the C-branches$_{Homo}$, C-branches$_{rand}$ or C-branches$_{MIKTO}$ microgels or units A for the C-branches$_{block}$ microgels.

Such microgels are capable of being obtained by processes known to persons skilled in the art, especially including the process known as "core first", the process known as "arm first" and the processes of chemical crosslinking of micelles. These processes are explained in detail later on ("processes used"). These processes may use controlled or living polymerization processes, using a transfer agent or group, for example via a controlled or living radical polymerization process. In the case of C-branches$_{MIKTO}$ microgels, the "arm first" type process is particularly suitable.

Microgels obtained by a "core first" process may have a transfer group or a group residue at the end of the branches. Copolymers obtained by an "arm first" process may have a transfer group or a group residue in the core.

Composition of the Microgels—Nature of the Units

The microgel, which is a core C or a C-branches microgel, comprises polymerized units. All the units mentioned below can be envisaged, and also their combinations in various parts of the microgel (in the core, in the branches, in the blocks, etc.). Certain combinations are the subject of particular embodiments. For these particular embodiments, the combinations among all the units mentioned below are understood as being limited to the combinations compatible with these particular embodiments.

According to one advantageous embodiment, the microgel comprises cationic or potentially cationic units or zwitterionic units in the core, and/or in the macromolecular branches at the periphery of the core. Thus, these units may be included in a core C or in a C-branches microgel. They may be core units C and/or units included in the macromolecular branches at the periphery of a core.

The core units C may especially be:
cationic or potentially cationic units $C_{cat}$ or zwitterionic units $C_Z$;
anionic or potentially anionic units $C_A$; or
hydrophilic or hydrophobic neutral units $C_N$.

The crosslinking units R are preferably units that derive from a crosslinking monomer R comprising at least two polymerizable groups, preferably that are multiethylenically unsaturated, or more preferably diethylenically unsaturated $R_{difunct}$.

The units A may especially be:
cationic or potentially cationic units $A_{cat}$ or zwitterionic units $A_Z$;
anionic or potentially anionic units $A_A$; or
hydrophilic or hydrophobic neutral units $A_N$.

The units B may especially be:
cationic or potentially cationic units $B_{cat}$ or zwitterionic units $B_Z$;
anionic or potentially anionic units $B_A$; or
hydrophilic or hydrophobic neutral units $B_N$.

According to one particular embodiment, the microgel is a C-branches$_{block}$ microgel where:
the block A is a hydrophilic intermediate block bonded to the core or at least partly included in the core; and
the block B is a peripheral block bonded to the block A, comprising cationic or potentially cationic units $B_{cat}$ or zwitterionic units $B_Z$.

In this embodiment, preferably:
the core C comprises core units C that are neutral and hydrophilic units $C_{Nphile}$;
the intermediate block A comprises neutral hydrophilic units $A_{Nphile}$; and
the peripheral block B comprises cationic or potentially cationic units $B_{cat}$ or zwitterionic units $B_Z$.

According to another particular embodiment, the microgel is a C-branches$_{block}$ microgel where:
the block A is an intermediate block bonded to the core or at least partly included in the core, comprising cationic or potentially cationic units $A_{cat}$ or zwitterionic units $A_Z$; and
the block B is a hydrophilic peripheral block bonded to the block A.

In this embodiment, preferably:
the core comprises core units C that are neutral hydrophilic units $C_{Nphile}$;
the intermediate block A comprises cationic or potentially cationic units $A_{cat}$; and
the peripheral block B comprises neutral hydrophilic units $B_{Nphile}$.

According to another particular embodiment, the microgel is a C-branches$_{MIKTO}$ microgel where:
the branches A are hydrophilic branches; and
the branches B comprise cationic or potentially cationic units $B_{cat}$ or zwitterionic units $B_Z$.

In this embodiment, preferably:
the core comprises core units C that are neutral hydrophilic units $C_{Nphile}$;

the branches A comprise neutral hydrophilic units $A_{Nphile}$; and the branches B comprise cationic or potentially cationic units $B_{cat}$ or zwitterionic units $B_Z$.

According to another particular embodiment, the microgel is a C-branches$_{rand}$ microgel where the branches comprise:

anionic or potentially anionic units $A_A$ and/or hydrophilic or hydrophobic neutral units $A_N$; and cationic or potentially cationic units $B_{cat}$ or zwitterionic units $B_Z$.

In this embodiment, preferably:

the core comprises core units C that are neutral hydrophilic units $C_{Nphile}$;

the branches comprise:

anionic or potentially anionic units $A_A$;

cationic units $B_{cat}$; and potentially cationic units $B_{cat}$ and/or hydrophilic neutral units $B_{Nphile}$.

As examples of potentially cationic monomers $A_{cat}$ and/or $B_{cat}$ and/or $C_{cat}$ from which the potentially cationic units $A_{cat}$ and/or $B_{cat}$ and/or $C_{cat}$ may derive, mention may be made of:

ω-(N,N-dialkylamino)alkyl amides of α,β-mono-ethylenically unsaturated carboxylic acids, such as N,N-dimethylaminomethyl acrylamide or methacrylamide, 2-(N,N-dimethylamino)ethyl acrylamide or methacrylamide, 3-(N,N-dimethylamino)propyl acrylamide or methacrylamide or 4-(N,N-dimethylamino)butyl acrylamide or methacrylamide;

α,β-monoethylenically unsaturated amino esters, such as 2-(dimethylamino)ethyl acrylate (ADAM), 2-(dimethylamino)ethyl methacrylate (DMAM or MADAM), 3-(dimethylamino)propyl methacrylate, 2-(tert-butylamino)ethyl methacrylate, 2-(dipentylamino)ethyl methacrylate or 2-(diethylamino)ethyl methacrylate;

vinylpyridines;

vinylamine;

vinylimidazolines; and precursor monomers of amine functional groups, such as N-vinylformamide, N-vinylacetamide, etc. which produce primary amine functional groups by simple acidic or basic hydrolysis.

As examples of cationic monomers $A_{cat}$ and/or $B_{cat}$ and/or $C_{cat}$ from which the potentially cationic units $A_{cat}$ and/or $B_{cat}$ and/or $C_{cat}$ may derive, mention may be made of:

ammonium acryloyl or acryloyloxy monomers such as:

trimethylammonium propylmethacrylate salts, in particular the chloride;

trimethylammonium ethylacrylamide chloride or bromide or trimethylammonium methacrylamide chloride or bromide;

trimethylammonium butylacrylamide methyl sulfate or trimethylammonium methacrylamide methyl sulfate;

trimethylammonium propylmethacrylamide methyl sulfate (MAPTA MeS);

(3-methacrylamidopropyl)trimethylammonium chloride (MAPTAC);

(3-acrylamidopropyl)trimethylammonium chloride or methyl sulfate (APTAC or APTA MeS);

(methacryloyloxyethyl)trimethylammonium chloride or methyl sulfate;

(acryloyloxyethyl)trimethylammonium (ADAMQUAT) salts such as (acryloyloxyethyl)trimethylammonium chloride; or (acryloyloxyethyl)trimethylammonium methyl sulfate (ADAMQUAT Cl or ADAMQUAT MeS);

methyldiethylammonium ethyl acrylate methyl sulfate (ADAEQUAT MeS);

benzyldimethylammonium ethyl acrylate chloride or methyl sulfate (ADAMQUAT BZ 80);

1-ethyl-2-vinylpyridinium or 1-ethyl-4-vinylpyridinium bromide, chloride or methyl sulfate;

N,N-dialkyldiallylamine monomers such as N,N-dimethyldiallylammonium chloride (DADMAC);

dimethylaminopropylmethacrylamide, N-(3-chloro-2-hydroxypropyl)trimethylammonium chloride (DIQUAT chloride);

dimethylaminopropylmethacrylamide, N-(3-methylsulfate-2-hydroxypropyl)trimethylammonium methyl sulfate (DIQUAT methyl sulfate); and the monomer of formula:

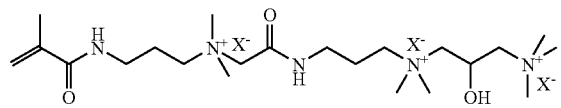

where X⁻ is an anion, preferably chloride or methyl sulfate.

As examples of neutral hydrophilic monomers $A_{Nphile}$ and/or $B_{Nphile}$ and/or $C_{Nphile}$ from which the neutral hydrophilic units $A_{Nphile}$ and/or $B_{Nphile}$ and/or $C_{Nphile}$ may derive, mention may be made of:

hydroxyalkyl esters of α,β-ethylenically unsaturated acids such as hydroxyethyl or hydroxypropyl acrylates and methacrylates, glycerol monomethacrylate, etc.;

α,β-ethylenically unsaturated amides such as acrylamide, methacrylamide, N,N-dimethyl methacryl-amide, N-methylolacrylamide, etc.;

α,β-ethylenically unsaturated monomers bearing a water-soluble polyoxyalkylenated segment of polyethylene oxide type, such as polyethylene oxide α-methacrylates (Bisomer S20W, S10W, etc. from Laporte) or α,ω-dimethacrylates, Sipomer BEM from Rhodia (ω-behenyl polyoxyethylene methacrylate), Sipomer SEM-25 from Rhodia (ω-tristyrylphenyl polyoxyethylene methacrylate), etc.;

vinyl alcohol;

α,β-ethylenically unsaturated precursor monomers of hydrophilic units or segments such as vinyl acetate which, once polymerized, may be hydrolyzed to generate vinyl alcohol units or polyvinyl alcohol segments;

vinylpyrrolidones;

α,β-ethylenically unsaturated monomers of ureido type and in particular the methacrylamido of 2-imidazolidinone ethyl (Sipomer WAM II from Rhodia); and nonethylene glycol methyl ether acrylate or nonethylene glycol methyl ether methacrylate.

As examples of neutral hydrophobic monomers from which neutral hydrophobic units may be derived, mention may be made of:

vinylaromatic monomers such as styrene, α-methylstyrene, vinyltoluene, etc.;

vinyl or vinylidene halides, such as vinyl chloride, or vinylidene chloride;

$C_1$-$C_{12}$ alkyl esters of α,β-monoethylenically unsaturated acids such as methyl acrylate, methyl methacrylate, ethyl acrylate, ethyl methacrylate, butyl acrylate, butyl methacrylate, 2-ethylhexyl acrylate, etc.;

vinyl or allyl esters of saturated carboxylic acids such as vinyl or allyl acetates, propionates, versatates, stearates, etc.;

$\alpha,\beta$-monoethylenically unsaturated nitriles containing 3 to 12 carbon atoms, such as acrylonitrile, methacrylonitrile, etc.;

$\alpha$-olefins such as ethylene, etc.;

conjugated dienes, such as butadiene, isoprene or chloroprene;

monomers capable of generating polydimethylsiloxane (PDMS) chains. Thus, the part B may be a silicone, for example a polydimethylsiloxane chain or a copolymer comprising dimethylsiloxy units; and diethylene glycol ethyl ether acrylate or diethylene glycol ethyl ether methacrylate.

As examples of anionic or potentially anionic monomers $A_A$ and/or $B_A$ and/or $C_A$ from which anionic or potentially anionic units may derive, mention may be made of:

monomers having at least one carboxylic functional group, such as $\alpha,\beta$-ethylenically unsaturated carboxylic acids or the corresponding anhydrides, such as acrylic acid, acrylic anhydride, methacrylic acid, methacrylic anhydride, maleic acid, maleic anhydride, fumaric acid, itaconic acid, N-methacryloylalanine, N-acryloylglycine and water-soluble salts thereof;

precursor monomers of carboxylate functional groups, such as tert-butyl acrylate, which generate, after polymerization, carboxylic functional groups by hydrolysis;

monomers having at least one sulfate or sulfonate functional group, such as 2-sulfooxyethyl methacrylate, vinylbenzenesulfonic acid, allyl-sulfonic acid, 2-acrylamido-2-methylpropanesulfonic acid, sulfoethyl acrylate or methacrylate, sulfopropyl acrylate or methacrylate and water-soluble salts thereof; and monomers having at least one phosphonate or phosphate functional group, such as vinylphosphonic acid, etc., ethylenically unsaturated phosphate esters such as the phosphates derived from hydroxyethyl methacrylate (EMPICRYL 6835 from Rhodia) and those derived from polyoxyalkylene methacrylates and water-soluble salts thereof.

As examples of zwitterionic monomers Az and/or Bz and/or Cz from which zwitterionic units Az and/or Bz and/or Cz may be derived, mention may be made of:

monomers bearing a carboxybetaine group;

monomers bearing a sulfobetaine group, for example sulfopropyldimethylammonium ethyl methacrylate (SPE), sulfoethyldimethylammonium ethyl methacrylate, sulfobutyldimethylammonium ethyl methacrylate, sulfohydroxypropyldimethylammonium ethyl methacrylate (SHPE), sulfopropyldimethylammonium propyl acrylamide, sulfopropyldimethylammonium propyl methacrylamide (SPP), sulfohydroxypropyldimethylammonium propyl methacrylamido (SHPP), sulfopropyldiethylammonium ethyl methacrylate, or sulfohydroxypropyldiethylammonium ethyl methacrylate; and monomers bearing a phosphobetaine group, such as phosphatoethyl trimethylammonium ethyl methacrylate.

The crosslinking monomers R from which crosslinking units R may derive, for example used in the "arm first" process or in the "core first" process, or used for preparing a core C, may be chosen from organic compounds comprising at least two ethylenic unsaturations and at most ten unsaturations and that are known as being reactive via a radical route.

Preferably, these monomers have two or three ethylenic unsaturations.

Thus, mention may especially be made of acrylic, methacrylic, acrylamido, methacrylamido, vinyl ester, vinyl ether, diene, styrene, $\alpha$-methyl styrene and allyl derivatives. These monomers may also contain functional groups other than the ethylenic unsaturations, for example hydroxyl, carboxyl, ester, amide, amino or substituted amino, mercapto, silane, epoxy or halo functional groups.

The monomers belonging to these families are divinylbenzene and derivatives of divinylbenzene, vinyl methacrylate, methacrylic acid anhydride, allyl methacrylate, ethylene glycol dimethacrylate, phenylene dimethacrylate, diethylene glycol dimethacrylate, triethylene glycol dimethacrylate, tetraethylene glycol dimethacrylate, polyethylene glycol 200 dimethacrylate, polyethylene glycol 400 dimethacrylate, 1,3-butanediol dimethacrylate, 1,4-butanediol dimethacrylate, 1,6-hexanediol dimethacrylate, 1,12-dodecanediol dimethacrylate, 1,3-glycerol dimethacrylate, diurethane dimethacrylate or trimethylolpropane trimethacrylate. For the family of multifunctional acrylates, mention may especially be made of vinyl acrylate, bisphenol A epoxy diacrylate, dipropylene glycol diacrylate, tripropylene glycol diacrylate, polyethylene glycol 600 diacrylate, ethylene glycol diacrylate, diethylene glycol diacrylate, triethylene glycol diacrylate, tetraethylene glycol diacrylate, ethyoxylated neopentyl glycol diacrylate, butanediol diacrylate, hexanediol diacrylate, aliphatic urethane diacrylate, trimethylolpropane triacrylate, ethoxylated trimethylolpropane triacrylate, propoxylated trimethylolpropane triacrylate, propoxylated glycerol triacrylate, aliphatic urethane triacrylate, trimethylolpropane tetraacrylate, or dipentaerythritol pentaacrylate. Regarding the vinyl ethers, mention may especially be made of vinyl crotonate, diethylene glycol divinyl ether, 1,4-butanediol divinyl ether or triethylene glycol divinyl ether. For the allyl derivatives, mention may especially be made of diallyl phthalate, diallyldimethylammonium chloride, diallyl maleate, sodium diallyloxyacetate, diallylphenylphosphine, diallylpyrocarbonate, diallyl succinate, N,N'-diallyltartardiamide, N,N-diallyl-2,2,2-trifluoroacetamide, the allyl ester of diallyloxy acetic acid, 1,3-diallylurea, triallylamine, triallyl trimesate, triallyl cyanurate, triallyl trimellitate or triallyl-1,3,5-triazine-2,4,6(1H,3H,5H)-trione. For the acrylamido derivatives, mention may especially be made of N,N'-methylenebisacrylamide, N,N'-methylenebismethacrylamide, glyoxal bisacrylamide or diacrylamido acetic acid. As regards the styrene derivatives, mention may especially be made of divinylbenzene and 1,3-diisopropenylbenzene. In the case of diene monomers, mention may especially be made of butadiene, chloroprene and isoprene.

As multiethylenically unsaturated monomers, N,N'-methylenebisacrylamide, divinylbenzene, ethylene glycol diacrylate or trimethylolpropane triacrylate are preferred.

These multiethylenically unsaturated monomers may be used alone or as mixtures. Furthermore, they are preferably polymerized in the presence of core monomers, preferably monoethylenically unsaturated core monomers.

According to one particular mode:

the microgel comprises:

cationic or potentially cationic units $A_{cat}$ and/or $B_{cat}$ and/or $C_{cat}$;

neutral hydrophilic units $A_{Nphile}$ and/or $B_{Nphile}$ and/or $C_{Nphile}$; and the weight ratio of the cationic or potentially cationic units to the neutral hydrophilic units is greater than or equal to 1.

Advantageously, the weight ratio of all of the cationic or potentially cationic units, usually the units $B_{cat}$, to the neutral units, usually the units $A_N$, is greater than or equal to 1.

The microgel may especially be presented in the form of a powder, in the form of a dispersion in a liquid or in the form of a solution in a solvent (water or another solvent). The form generally depends on the requirements linked to the use of the microgel. It may also be linked to the process for preparing the microgel.

The microgel with branches preferably comprises at least 10 branches, and generally at most around 250 branches. The number of branches may be controlled by the choice of the preparation method and the type of core used. This is known to a person skilled in the art. A suitable microgel is, for example, a microgel obtained by controlled radical polymerization using a "precursor" control or transfer agent, in the presence of a source of free radicals, of a crosslinking monomer R that is a diethylenically unsaturated monomer $R_{difunct}$, with a theoretical coefficient for generating branches that is greater than or equal to 0.25.

The branches may have a molecular weight (theoretical or measured) between 1000 g/mol and 100 000 g/mol. It is preferably between 10 000 g/mol and 30 000 g/mol. In these branches, the blocks may have a molecular weight between 1000 g/mol and 99 000 g/mol, preferably between 2000 g/mol and 28 000 g/mol.

Processes Used for Preparing the Microgel

Any processes that make it possible to prepare microgels such as described above may be used.

Particularly advantageous processes use a controlled or living polymerization, with the aid of a transfer agent or group, for example by a controlled or living radical polymerization process. This polymerization makes it possible, in particular, to prepare cores, macromolecular branches, blocks, block copolymers, especially by growth of said cores, macromolecular branches, blocks and block copolymers. Numerous controlled or living radical polymerization processes and/or numerous transfer agents or groups have been described. They are known to a person skilled in the art. It is mentioned that it is not excluded to use other methods, especially ring-opening polymerizations (especially anionic or cationic), anionic or cationic polymerizations or grafting methods.

As examples of living or controlled polymerization processes, reference may especially be made to:
- the processes from Applications WO 98/58974, WO 00/75207 and WO 01/42312 which use a radical polymerization controlled by xanthate type control agents;
- the radical polymerization process controlled by dithioester or trithiocarbonate type control agents from Application WO 98/01478;
- the process described in Application WO 02/08307, especially for obtaining copolymers comprising polyorganosiloxane blocks;
- the radical polymerization process controlled by dithiocarbamate type control agents from Application WO 99/31144;
- the radical polymerization process controlled by dithiocarbazate type control agents from Application WO 02/26836;
- the radical polymerization process controlled by dithiophosphoro ester type control agents from Application WO 02/10223, (optionally, the block copolymers obtained as above by controlled radical polymerization may undergo a reaction for purification of their sulfur-containing end chain, for example via hydrolysis, oxidation, reduction, pyrolysis or substitution type processes);
- the process from Application WO 99/03894 which uses a polymerization in the presence of nitroxide precursors;
- the process from Application WO 96/30421 which uses an atom transfer radical polymerization (ATRP);
- the radical polymerization process controlled by iniferter type control agents according to the teaching of Otu et al., Makromol. Chem. Rapid. Commun., 3, 127 (1982);
- the radical polymerization process controlled by degenerative iodine transfer according to the teaching of Tatemoto et al., Jap. 50, 127, 991 (1975), Daikin Kogyo Co. Ltd. Japan and Matyjaszewski et al., Macromolecules, 28, 2093 (1995);
- the radical polymerization process controlled by tetraphenylethane derivatives, disclosed by D. Braun et al. in Macromol. Symp. 111, 63 (1996);
- the radical polymerization process controlled by organocobalt complexes described by Wayland et al. in J. Am. Chem. Soc., 116, 7973 (1994); and
- the radical polymerization process controlled by diphenylethylene (WO 00/39169 or WO 00/37507).

The controlled or living radical polymerizations using transfer agents or groups (or control agents) having an —S—CS— group (xanthates, dithioesters, trithiocarbonates, etc.) are particularly advantageous.

A first practical process for preparing microgels with branches is a "core first" type process. Such a process may comprise the following steps:
- step a) polymerization, preferably controlled radical polymerization, to obtain a core C (chemically crosslinked polymeric core), of a composition comprising:
  - optionally at least one monoethylenically unsaturated core monomer (core monomer C);
  - at least one crosslinking monomer R;
  - a source of free radicals; and
  - a control or transfer agent;
- step b) growth of the macromolecular branches of the C-branches$_{block}$ or C-branches$_{rand}$ or C-branches$_{Homo}$ microgels from monoethylenically unsaturated monomers A and/or B, by polymerization, preferably controlled radical polymerization, to obtain branches linked to the core. Within the context of preparing a C-branches$_{block}$ microgel, step b) comprises a step b1) for growth of the intermediate block A starting from monomers A, to obtain blocks A linked to the core, then a step b2) for growth of a block B from monomers B, to obtain blocks B linked to the blocks A.

Step a) of the "core first" process is a step of preparing a core or a random microgel. The product obtained is sometimes known as a first generation copolymer or polymer or microgel.

Step b) of the "core first" process is a step for growth of macromolecular branches from the core. The product obtained is sometimes known as a second generation copolymer or polymer or microgel.

Step b2) of the "core first" process is a step for growth of a second block from the previous block. The product obtained is sometimes known as a third generation copolymer or polymer or microgel.

The monoethylenically unsaturated core monomer (core monomer C) may be the same as that of the branches. It may optionally be different.

A second practical process for preparing star copolymers is an "arm first" type process. Such a process may comprise the following steps:

step a') preparation, preferably by controlled radical polymerization, of macromolecular chains which will constitute the branches, comprising units A and/or B, and preferably having a control or transfer group at the end. In the case where the microgel is a C-branches$_{block}$ microgel, the macromolecular chain is a block copolymer, preferably comprising a control or transfer group at the end of the block A;

step b') polymerization, preferably controlled radical polymerization, onto the chains of a composition comprising:

at least one crosslinking, preferably multiethylenically unsaturated, monomer R;

optionally a source of free radicals;

optionally a core monomer (core monomer C), preferably a monoethylenically unsaturated core monomer; and the macromolecular chains from step a').

Step a') of the "arm first" process is sometimes known as preparation of a first generation polymer or copolymer.

Step b') leads to the star copolymer and is sometimes known as obtaining or preparing a second generation copolymer.

The monoethylenically unsaturated core monomer (core monomer C) may be the same as that of the branches. It may optionally be different.

The macromolecular branches from step a') may be block copolymers, for example obtained by a process comprising the following steps:

step a'1): preparation of the block B by polymerization, preferably controlled radical polymerization, of a composition comprising:

at least one monoethylenically unsaturated monomer B;

a source of free radicals; and at least one control agent, it being understood that this process is preferably carried out in the absence of a crosslinking (multiethylenically unsaturated) monomer R; then step a'2) obtaining block copolymers, by growth of the block A on the block B by polymerization, preferably controlled radical polymerization, of a composition comprising:

at least one monoethylenically unsaturated monomer A; and optionally a source of free radicals, it being understood that this process is preferably carried out in the absence of a crosslinking (multiethylenically unsaturated) monomer R.

Such processes for preparing block copolymers are known and have been the subject of numerous publications.

For the steps of forming the core (step a or b'), the molar fraction of crosslinking (multiethylenically unsaturated) monomers R relative to the monoethylenically unsaturated core monomers is advantageously between 0.001 and 1. Preferably the molar fraction is between 0.01 and 1.

The first steps of the processes (step a or a', more specifically a'1) are carried out in the presence of a source of free radicals. However, for certain monomers such as styrene, the free radicals that make it possible to initiate the polymerization may be generated by the monoethylenically unsaturated monomer at sufficiently high temperatures, generally above 100° C. It is not, in this case, necessary to add an additional source of free radicals.

The source of free radicals used is generally a radical polymerization initiator. The radical polymerization initiator may be chosen from the initiators conventionally used in radical polymerization. It may be, for example, one of the following initiators:

hydrogen peroxides such as: tert-butyl hydroperoxide, cumene hydroperoxide, tert-butyl peroxyacetate, tert-butyl peroxybenzoate, tert-butyl peroxyoctoate, tert-butyl peroxyneodecanoate, tert-butyl peroxyisobutarate, lauroyl peroxide, tert-amyl peroxypivalate, tert-butyl peroxypivalate, dicumyl peroxide, benzoyl peroxide, potassium persulfate or ammonium persulfate;

azo compounds such as: 2,2'-azobis(isobutyronitrile), 2,2'-azobis(2-butanenitrile) 4,4'-azobis(4-pentanoic acid), 1,1'-azobis(cyclohexanecarbonitrile), 2-(tert-butylazo)-2-cyanopropane, 2,2'-azobis[2-methyl-N-(1,1)-bis(hydroxymethyl)-2-hydroxyethyl]proprionamide, 2,2'-azobis(2-methyl-N-hydroxyethyl]-propionamide, 2,2'-azobis(N,N'-dimethyleneisobutyramidine) dichloride, 2,2'-azobis(2-amidinopropane)dichloride, 2,2'-azobis (N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis (hydroxymethyl)ethyl]proprionamide), 2,2'-azobis[2-methyl-N-(2-hydroxyethyl)propionamide], 2,2'-azobis (isobutyramide)dihydrate;

redox systems comprising combinations such as:

mixtures of hydrogen peroxide, alkyl peroxide, peresters, percarbonates and the like and of any iron salts, titanium salts, zinc formaldehyde sulfoxylate or sodium formaldehyde sulfoxylate, and reducing sugars;

alkali metal or ammonium persulfates, perborate or perchlorate in combination with an alkali metal bisulfite, such as sodium metabisulfite, and reducing sugars; and alkali metal persulfates in combination with an arylphosphinic acid such as benzene phosphonic acid and the like, and reducing sugars.

The amount of initiator to be used is preferably determined so that the amount of radicals generated is at most 50 mol %, preferably at most 20 mol %, relative to the amount of control or transfer agent.

The polymerizations may be carried out in any suitable physical form, for example in solution in water or in a solvent, for example an alcohol or THF, in emulsion in water (process known as "latex"), in bulk, if necessary by controlling the temperature and/or the pH in order to make the species liquid and/or soluble or insoluble.

After carrying out the preparation processes described above, it is mentioned that it is possible to deactivate or eliminate or destroy possible transfer groups present in the microgel, for example by hydrolysis, ozonolysis or reaction with amines.

It is specified that the microgels are preferably obtained directly after the polymerization and the optional deactivation, elimination or destruction of transfer groups, without a step of functionalizing the copolymer after the polymerization.

Composition and Uses

The composition is preferably a liquid composition, comprising a liquid application carrier, for example water, an alcohol or a mixture. It usually comprises a surfactant.

The composition according to the invention is especially capable of providing the hard surfaces to be treated with antideposition and/or antiadhesion properties with regard to soiling substances. It may be, for example:

a cleaning or rinsing composition for domestic use; it can be universal or can be more specific, such as a composition for cleaning or rinsing the bathroom; said composition prevents in particular deposition of soap salts around bath tubs and on bathroom sinks, prevents the growth and/or the deposition of calcium crystals on these surfaces, and delays the appearance of subsequent soap stains;

the kitchen; said composition makes it possible to improve the cleaning of worktops when the latter are soiled by unsaturated fatty soiling substances capable of crosslinking over time; the greasy stains come off with water without rubbing;

floors (made of linoleum, tiling or cement); said composition makes it possible to improve the removal of dust or soiling substances of argilo-calcareous types (soil, sand, mud, and the like) stains on the floor can be cleaned without effort by simple sweeping, without brushing; in addition, said composition contributes slip-resistance properties;

toilet bowls; said composition makes it possible to prevent the adhesion of traces of excrement to the surface; the flow alone of the flush of water is sufficient to remove these traces; the use of a brush is unnecessary;

windows or mirrors; said composition makes it possible to prevent the deposition of inorganic or organic particulate soiling substances on the surface;

dishes, by hand or using an automatic device; said composition makes it possible, in the case of washing by hand, to facilitate the removal of the residual stains from dried foods and to wash a larger number of items of cutlery or utensils with the same volume of washing medium; the surface of the still-wet items of cutlery and utensils is no longer slippery and thus does not escape from the hands of the user; a squeaky clean effect has also been observed, namely that the surface "squeaks" under the effect of rubbing with the finger. In the case of washing or rinsing in a dishwasher, said composition makes possible the antiredeposition of soiling substances originating from foodstuffs and of insoluble inorganic calcium salts, and contributes shininess to the utensils and items of cutlery; the composition also makes it possible no longer to have to "prewash" the items of cutlery or utensils before they are introduced into the dishwasher.

a cleaning or rinsing composition for industrial or communal use; it can be universal or more specific, such as a composition for cleaning reactors, steel blades, sinks or tanks, dishes, exterior or interior surfaces of buildings, windows of buildings, including apartment buildings, bottles.

The composition according to the invention can be provided in any form and can be used in multiple ways. Thus, it can be in the form of a gelled or ungelled liquid to be deposited as such, in particular by spraying,
  directly on the surfaces to be cleaned or rinsed, or
  on a sponge or another substrate (woven or nonwoven article made of cellulose, for example) before being applied to the surface to be treated, of a gelled or ungelled liquid to be diluted in water (optionally with the addition of another solvent) before being applied to the surface to be treated, of a gelled or ungelled liquid held in a water-soluble bag, of a foam, of an aerosol, of a liquid absorbed on an absorbent substrate made of an article which is woven or nonwoven in particular (wipe), of a solid, in particular a tablet, optionally held in a water-soluble bag, it being possible for said composition to represent all or part of the tablet.

For satisfactory implementation of the invention, the microgel is present in the composition forming the subject matter of the invention in an amount which is effective for modifying and/or treating the surface.

It may be, for example, an amount which is effective in contributing, to said surfaces, antideposition and/or antiadhesion properties with regard to soiling substances liable to be deposited on said surfaces.

Said composition forming the subject matter of the invention can comprise, depending on its application, from 0.001 to 10% of its weight of the microgel.

The pH of the composition or the pH of use of the composition according to the invention can vary, depending on the applications and the surfaces to be treated, from 1 to 14, indeed even from 0.5 to 14. Extreme pH values are conventional in the applications of industrial or communal cleaning type. In the field of domestic applications, the pH values range instead from 1 to 13, depending on the applications.

Said composition can be employed for the cleaning or rinsing of hard surfaces in an amount such that, after optional rinsing and after drying, the amount of polybetaine (B) deposited on the surface is from 0.0001 to 10 mg/m$^2$, preferably from 0.001 to 5 mg/m$^2$, of surface treated.

The cleaning or rinsing composition according to the invention additionally comprises at least one surfactant. This may be nonionic, anionic, amphoteric, zwitterionic or cationic. It may also be a mixture or a combination of surfactants.

Mention may be made, among anionic surfactants, by way of examples, of:

alkyl ester sulfonates of formula R—CH($SO_3$M)-COOR', where R represents a $C_8$-$C_{20}$, preferably $C_{10}$-$C_{16}$, alkyl radical, R' represents a $C_1$-$C_6$, preferably $C_1$-$C_3$, alkyl radical and M represents an alkali metal (sodium, potassium or lithium) cation, a substituted or unsubstituted ammonium (methyl-, dimethyl-, trimethyl- or tetramethylammonium, dimethylpiperidinium, and the like) cation or a cation derived from an alkanolamine (monoethanolamine, diethanolamine, triethanolamine, and the like). Mention may very particularly be made of methyl ester sulfonates in which the radical R is a $C_{14}$-$C_{16}$ radical;

alkyl sulfates of formula ROSO$_3$M, where R represents a $C_5$-$C_{24}$, preferably $C_{10}$-$C_{18}$, alkyl or hydroxyalkyl radical (such as salts of fatty acids derived from copra and tallow), M representing a hydrogen atom or a cation with the same definition as above, and their ethoxylated (EO) and/or propoxylenated (PO) derivatives, having on average from 0.5 to 30, preferably from 0.5 to 10, EO and/or PO units;

alkylamide sulfates of formula RCONHR'OSO$_3$M, where R represents a $C_2$-$C_{22}$, preferably $C_6$-$C_{20}$, alkyl radical and R' represents a $C_2$-$C_3$ alkyl radical, M representing a hydrogen atom or a cation with the same definition as above, and their ethoxylated (EO) and/or propoxylenated (PO) derivatives, having on average from 0.5 to 60 EO and/or PO units;

salts of saturated or unsaturated $C_8$-$C_{24}$, preferably $C_{14}$-$C_{20}$, fatty acids, $C_9$-$C_{20}$ alkylbenzenesulfonates, primary or secondary $C_8$-$C_{22}$ alkylsulfonates, alkylglycerolsulfonates, the sulfonated polycarboxylic acids disclosed in GB-A-1 082 179, paraffin sulfonates, N-acyl-N-alkyltaurates, isethionates, alkylsuccinamates, alkylsulfosuccinates, monoesters or diesters of sulfosuccinates, N-acylsarcosinates, alkylglycoside sulfates, polyethoxycarboxylates, monoglyceride sulfates and condensates of fatty acid chlorides with hydroxyalkylsulfonates; the cation can be an alkali metal (sodium, potassium or lithium), a substituted or unsubstituted ammonium (methyl-, dimethyl-, trimethyl- or tetramethylammonium, dimethylpiperidinium, and the like) residue, or a residue derived from an alkanolamine (monoethanolamine, diethanolamine, triethanolamine, and the like);

alkyl phosphates, or alkyl or alkylaryl phosphate esters, such as Rhodafac RA600, Rhodafac PA15 or Rhodafac PA23, sold by Rhodia; the cation can be an alkali metal (sodium, potassium or lithium), a substituted or unsubstituted ammonium (methyl-, dimethyl-, trimethyl- or tetramethylammonium, dimethylpiperidinium, and the like) residue, or a residue derived from an alkanolamine (monoethanolamine, diethanolamine, triethanolamine, and the like).

A description of nonionic surfactants is given in U.S. Pat. No. 4,287,080 and U.S. Pat. No. 4,470,923. Mention may in particular be made of condensates of alkylene oxide, in particular of ethylene oxide and optionally of propylene oxide, with alcohols, polyols, alkylphenols, fatty acid esters, fatty acid amides and fatty amines; amine oxides; sugar derivatives, such as alkylpolyglycosides or esters of fatty acids and of sugars, in particular sucrose monopalmitate; long-chain (of 8 to 28 carbon atoms) tertiary phosphine oxides; dialkyl sulfoxides; block copolymers of polyoxyethylene and of polyoxypropylene; polyalkoxylated esters of sorbitan; fatty esters of sorbitan; poly(ethylene oxide)s and fatty acid amides modified so as to confer thereon a hydrophobic nature (for example, fatty acid mono- and diethanolamides comprising from 10 to 18 carbon atoms).

Mention may very particularly be made of:
polyoxyalkylenated $C_8$-$C_{18}$ aliphatic carboxylic acids comprising from 2 to 50 oxyalkylene (oxyethylene and/or oxypropylene) units, in particular of those with 12 (mean) carbon atoms or with 18 (mean) carbon atoms,
polyoxyalkylenated $C_6$-$C_{24}$ aliphatic alcohols comprising from 2 to 50 oxyalkylene (oxyethylene and/or oxypropylene) units, in particular of those with 12 (mean) carbon atoms or with 18 (mean) carbon atoms; mention may be made of Antarox B12DF, Antarox FM33, Antarox FM63 and Antarox V74 from Rhodia, Plurafac LF 400 and Plurafac LF 220 from BASF, Rhodasurf ID 060, Rhodasurf ID 070 and Rhodasurf LA 42 from Rhodia and Synperonic A5, A7 and A9 from ICI,
amine oxides, such as dodecyldi(2-hydroxyethyl)amine oxide,
phosphine oxides, such as tetradecyldimethylphosphine oxide.

Mention may be made, among amphoteric surfactants, of:
sodium iminodipropionates or alkyliminopropionates, such as Mirataine H2C HA and Mirataine JC HA from Rhodia,
alkyl amphoacetates or alkyl amphodiacetates, the alkyl group of which comprises from 6 to 20 carbon atoms, such as Miranol C2M Conc NP, sold by Rhodia,
amphoteric alkylpolyamine derivatives, such as Amphionic XL®, sold by Rhodia, and Ampholac 7T/X® and Ampholac 7C/X®, sold by Berol Nobel.

Mention may be made, among zwitterionic surfactants, of those disclosed in U.S. Pat. No. 5,108,660.

The preferred zwitterionic surfactants are alkyl dimethyl betaines, alkyl amidopropyldimethyl betaines, alkyl dimethyl sulfobetaines or alkyl amidopropyldimethyl sulfobetaines, such as Mirataine JCHA, Mirataine H2CHA or Mirataine CBS, sold by Rhodia, or those of the same type sold by Sherex Company under the name of "Varion CADG Betaine" and "Varion CAS Sulfobetaine", or the condensation products of fatty acids and of protein hydrolysates.

Other zwitterionic surfactants are also disclosed in U.S. Pat. No. 4,287,080 and in U.S. Pat. No. 4,557,853.

Mention may in particular be made, among cationic surfactants, of the quaternary ammonium salts of formula $$R^1R^2R^3R^4N^+X^-$$

where
$R^1$, $R^2$ and $R^3$, which are identical or different, represent H or an alkyl group comprising less than 4 carbon atoms, preferably 1 or 2 carbon atom(s) which is optionally substituted by one or more hydroxyl functional group(s), or can form, together with the nitrogen atom $N^+$, at least one aromatic or heterocyclic ring,
$R^4$ represents a $C_8$-$C_{22}$, preferably $C_{12}$-$C_{22}$, alkyl or alkenyl group or an aryl or benzyl group, and
$X^-$ is a solubilizing anion, such as halide (for example, chloride, bromide or iodide), sulfate or alkyl sulfate (methyl sulfate), carboxylate (acetate, propionate or benzoate), alkylsulfonate or arylsulfonate.

Mention may in particular be made of dodecyltrimethylammonium bromide, tetradecyltrimethylammonium bromide, cetyltrimethylammonium bromide, stearylpyridinium chloride, Rhodaquat® TFR and Rhodamine® C15, which are sold by Rhodia, cetyltrimethylammonium chloride (Dehyquart ACA and/or AOR from Cognis) or cocobis(2-hydroxyethyl)ethylammonium chloride (Ethoquad C12 from Akzo Nobel).

Mention may also be made of other cationic surfactants, such as:
quaternary ammonium salts of formula $$R^{1'}R^{2'}R^{3'}R^{4'}N^+X^-$$

where
$R^{1'}$ and $R^{2'}$, which are identical or different, represent H or an alkyl group comprising less than 4 carbon atoms, preferably 1 or 2 carbon atom(s), which is optionally substituted by one or more hydroxyl functional group(s); or can form, together with the nitrogen atom $N^+$, a heterocyclic ring,
$R^{3'}$ and $R^{4'}$ represent a $C_8$-$C_{22}$, preferably $C_{10}$-$C_{22}$, alkyl or alkenyl group or an aryl or benzyl group, and
$X^-$ is an anion, such as halide (for example, chloride, bromide or iodide), sulfate or alkyl sulfate (methyl sulfate), carboxylate (acetate, propionate or benzoate), alkylsulfonate or arylsulfonate.

Mention may in particular be made of: dialkydimethylammonium chlorides, such as ditallowdimethylammonium chloride or methyl sulfate, and the like, or alkylbenzyldimethylammonium chlorides.

($C_{10}$-$C_{25}$)alkylimidazolium salts, such as ($C_{10}$-$C_{25}$)alkylimidazolinium methyl sulfates,
salts of substituted polyamines, such as N-tallow-N,N',N'-triethanol-1,3-propylenediamine dichloride or di(methyl sulfate) or N-tallow-N,N,N',N',N'-pentamethyl-1,3-propylenediamine dichloride.

Additional examples of appropriate surfactants are compounds generally used as surface active agents denoted in the well-known handbook "Surface Active Agents", volume I, by Schwartz and Perry, and "Surface Active Agents and Detergents", volume II, by Schwartz, Perry and Berch.

The surfactants represent from 0.005 to 60%, in particular from 0.5 to 40%, of the weight of the composition of the invention, this being according to the nature of the surfactant(s) and the destination of the cleaning composition.

Advantageously, the microgel/surfactant(s) ratio by weight is between 1/1 and 1/1000, advantageously 1/2 and 1/200.

The preferably cleaning or rinsing composition according to the invention can additionally comprise at least one other additive chosen in particular from conventional additives present in compositions for cleaning or rinsing hard surfaces.

Mention may in particular be made of:
chelating agents, in particular of the water-soluble aminophosphonates and organic phosphonates type, such as
1-hydroxyethane-1,1-diphosphonates,
aminotri(methylenediphosphonate),
vinyldiphosphonates,
salts of oligomers or polymers of vinylphosphonic or vinyldiphosphonic acid,
salts of random cooligomers or copolymers of vinylphosphonic or vinyldiphosphonic acid and of acrylic acid and/or of maleic anhydride and/or of vinylsulfonic acid and/or of acrylamidomethylpropanesulfonic acid,
salts of phosphonated polycarboxylic acids,
polyacrylates comprising phosphonate ending(s),
salts of cotelomers of vinylphosphonic or vinyldiphosphonic acid and of acrylic acid,
such as those of the Briquest® range or Mirapol A300 or 400 from Rhodia (in a proportion of 0 to 10%, preferably of 0 to 5%, of the total weight of cleaning composition);
sequestering or scale-inhibiting agents, such as
polycarboxylic acids or their water-soluble salts and water-soluble salts of carboxylic polymers or copolymers, such as
polycarboxylate or hydroxypolycarboxylate ethers,
polyacetic acids or their salts (nitriloacetic acid, N,N-dicarboxymethyl-2-aminopentanedioic acid, ethylenediaminetetraacetic acid, diethylenetriaminepentaacetic acid, ethylenediaminetetraacetates, nitriloacetates or N-(2-hydroxyethyl)nitrilodiacetates),
salts of ($C_5$-$C_{20}$ alkyl)succinic acids,
polycarboxylic acetal esters,
salts of polyaspartic or polyglutamic acids,
citric acid, adipic acid, gluconic acid or tartaric acid, or their salts,
copolymers of acrylic acid and of maleic anhydride or acrylic acid homopolymers, such as Rhodoline DP 226 35 from Rhodia and Sokalan CP5 from BASF (in a proportion of 0 to 10% of the total weight of said cleaning composition),
sulfonated polyvinylstyrenes or their copolymers with acrylic acid, methacrylic acid, and the like,
(in a proportion of 0 to 10% of the total weight of cleaning composition);
inorganic builders (detergency adjuvants which improve the surface properties of surfactants) of the type:
alkali metal, ammonium or alkanolamine polyphosphates, such as Rhodiaphos HD7, sold by Rhodia (in a proportion of 0 to 70% of the total weight of cleaning composition),
alkali metal pyrophosphates,
alkali metal silicates with an $SiO_2/M_2O$ ratio which can range from 1 to 4, preferably from 1.5 to 3.5, very particularly from 1.7 to 2.8; they can be amorphous silicates or lamellar silicates, such as the α, β, γ and δ phases of $Na_2Si_2O_5$, sold under the references NaSKS-5, NaSKS-7, NaSKS-11 and NaSKS-6 by Clariant,
alkali metal or alkaline earth metal borates, carbonates, bicarbonates or sesquicarbonates (in an amount which can range up to approximately 50% of the total weight of said cleaning composition),
cogranules of alkali metal silicate hydrates, with an $SiO_2/M_2O$ ratio which can range from 1.5 to 3.5, and of alkali metal (sodium or potassium) carbonates; mention may in particular be made of the cogranules in which the content by weight of water associated with the silicate with respect to the dry silicate is at least 33/100, it being possible for the ratio by weight of the silicate to the carbonate to range from 5/95 to 45/55, preferably from 15/85 to 35/65, such as disclosed in EP-A-488 868 and EP-A-561 656, for example Nabion 15, sold by Rhodia,
(it being possible for the total amount of builders to represent up to 90% of the total weight of said cleaning or rinsing composition);
bleaching agents of the perborates or percarbonates type, which may or may not be combined with acetylated bleaching activators, such as N,N,N',N'-tetraacetylethylenediamine (TAED), or chlorinated products of the chloroisocyanurates type, or chlorinated products of the alkali metal hypochlorites type, or aqueous hydrogen peroxide solution (in a proportion of 0 to 30% of the total weight of said cleaning composition);
fillers of the sodium sulfate, sodium chloride, sodium carbonate, calcium carbonate, kaolin or silica type, in a proportion of 0 to 50% of the total weight of said composition;
bleaching catalysts comprising a transition metal, in particular iron, manganese and cobalt complexes, such as those of the type $[Mn^{IV}_2(\mu\text{-}O)_3(Me_3TACN)_2](PF_6)_2$, $[Fe^{II}(MeN_4py)(MeCN)](ClO_4)_2$, $[(Co^{III})(NH_3)_5(OAc)](OAc)_2$, disclosed in U.S. Pat. Nos. 4,728,455, 5,114,606, 5,280,117, EP-A-909 809, U.S. Pat. No. 5,559,261, WO 96/23859, 96/23860 and 96/23861 (in a proportion of 0 to 5% of the total weight of said cleaning composition);
agents which influence the pH of the composition, which are soluble in the cleaning or rinsing medium, in particular
basifying additives (alkali metal phosphates, carbonates, perborates or alkali metal hydroxides) or
optionally cleaning acidifying additives, such as inorganic acids (phosphoric, polyphosphoric, sulfamic, hydrochloric, hydrofluoric, sulfuric, nitric or chromic acid), carboxylic or polycarboxylic acids (acetic, hydroxyacetic, adipic, citric, formic, fumaric, gluconic, glutaric, glycolic, malic, maleic, lactic, malonic, oxalic, succinic and tartaric acid), or salts of acids, such as sodium bisulfate or alkali metal bicarbonates and sesquicarbonates;
polymers used to control the viscosity of the mixture and/or the stability of the foams formed during use, such as cellulose derivatives or guar derivatives (carboxymethylcellulose, hydroxyethylcellulose, hydroxypropylguar, carboxymethylguar, carboxymethylhydroxypropylguar, and the like), xanthan gum, succinoglycan (Rheozan® sold by Rhodia), locust bean gum or carrageenans (in a proportion of 0 to 2% of the total weight of said cleaning composition);
hydrotropic agents, such as short-chain $C_2$-$C_8$ alcohols, in particular ethanol, diols and glycols, such as diethylene glycol or dipropylene glycol, sodium xylenesulfonate or sodium naphthalenesulfonate (in a proportion of 0 to 10 g per 100 g of said cleaning composition);

hydrating or moisturizing agents for the skin, such as glycerol or urea, or agents for protecting the skin, such as proteins or protein hydrolysates, vegetable oils, such as soybean oil, or cationic polymers, such as cationic guar derivatives (Jaguar C13S®, Jaguar C162® or Hicare 10000®, sold by Rhodia) (in a proportion of 0 to 40% of the total weight of said cleaning composition);

biocides or disinfectants, such as
cationic biocides, for example
mono(quaternary ammonium) salts, such as
cocoalkylbenzyldimethylammonium, ($C_{12}$-$C_{14}$ alkyl)-benzyldimethylammonium, cocoalkyldichlorobenzyldimethylammonium, tetradecylbenzyldimethylammonium, didecyldimethylammonium or dioctyldimethylammonium chlorides,
myristyltrimethylammonium or cetyltrimethylammonium bromides,
monoquaternary heterocyclic amine salts, such as laurylpyridinium, cetylpyridinium or ($C_{12}$-$C_{14}$ alkyl)-benzylimidazolium chlorides,
(fatty alkyl)triphenylphosphonium salts, such as myristyltriphenylphosphonium bromide,
polymeric biocides, such as those derived from the reaction
of epichlorohydrin and of dimethylamine or of diethylamine,
of epichlorohydrin and of imidazole,
of 1,3-dichloro-2-propanol and of dimethylamine,
of 1,3-dichloro-2-propanol and of 1,3-bis(dimethylamino)-2-propanol,
of ethylene dichloride and of 1,3-bis(dimethylamino)-2-propanol,
of bis(2-chloroethyl)ether and of N,N'-bis(dimethylaminopropyl)urea or -thiourea,
biguanidine polymer hydrochlorides, such as Vantocil IB,
amphoteric biocides, such as N—[N'—($C_8$-$C_{18}$ alkyl)-3-aminopropyl]glycine, N—{N'—[N"—($C_8$-$C_{18}$ alkyl)-2-aminoethyl]-2-aminoethyl}glycine or N,N-bis[N'-($C_8$-$C_{18}$ alkyl)-2-aminoethyl]glycine derivatives, such as (dodecyl)(aminopropyl)glycine or (dodecyl)(diethylenediamine)glycine,
amines, such as N-(3-aminopropyl)-N-dodecyl-1,3-propanediamine,
halogenated biocides, such as iodophores and hypochlorite salts, such as sodium dichloroisocyanurate,
phenolic biocides, such as phenol, resorcinol, cresols or salicylic acid,
hydrophobic biocides, such as
para-chloro-meta-xylenol or dichloro-meta-xylenol,
4-chloro-m-cresol,
resorcinol monoacetate,
mono- or polyalkyl or -aryl phenols, cresols or resorcinols, such as o-phenylphenol, p-tert-butylphenol, or 6-(n-amyl)-m-cresol,
alkyl and/or aryl chloro- or bromophenols, such as o-benzyl-p-chlorophenol,
halogenated diphenyl ethers, such as 2',4,4'-trichloro-2-hydroxydiphenyl ether (triclosan) or 2,2'-dihydroxy-5,5'-dibromodiphenyl ether,
chlorphenesin (p-chlorophenyl glyceryl ether),
in a proportion of 0 to 5% of the total weight of said cleaning composition;
solvents having a good cleaning or degreasing activity, such as
alkylbenzenes of octylbenzene type,
olefins having a boiling point of at least 100° C., such as α-olefins, preferably 1-decene or 1-dodecene,
glycol ethers of general formula $R1O(R2O)_mH$, where R1 is an alkyl group exhibiting from 3 to 8 carbons and each R2 is either an ethylene or propylene and m is a number which varies from 1 to 3; mention may be made of monopropylene glycol monopropyl ether, dipropylene glycol monobutyl ether, monopropylene glycol monobutyl ether, diethylene glycol monohexyl ether, monoethylene glycol monohexyl ether, monoethylene glycol monobutyl ether and their mixtures,
diols exhibiting from 6 to 16 carbon atoms in their molecular structure; diols are particularly advantageous as, in addition to their degreasing properties, they can help in removing calcium salts (soaps); diols comprising from 8 to 12 carbon atoms are preferred, very particularly 2,2,4-trimethyl-1,3-pentanediol,
other solvents, such as pine oil, orange terpenes, benzyl alcohol, n-hexanol, phthalic esters of alcohols having 1 to 4 carbon atoms, butoxy propanol, Butyl Carbitol and 1-(2-(n-butoxy)-1-methylethoxy)propan-2-ol, also known as butoxypropoxy propanol or dipropylene glycol monobutyl ether, diglycol hexyl (Hexyl Carbitol), butyl triglycol, diols, such as 2,2,4-trimethyl-1,3-pentanediol, and their mixtures,
(in a proportion of 0 to 30% of the total weight of said cleaning composition);
industrial cleaners, such as solutions of alkali metal salts of the phosphate, carbonate, silicate, and the like, type of sodium or potassium (in a proportion of 0 to 50% of the total weight of said cleaning composition);
water-soluble organic solvents with little cleaning effect, such as methanol, ethanol, isopropanol, ethylene glycol, propylene glycol and their mixtures (in a proportion of 0 to 40% of the total weight of said cleaning composition);
cosolvents, such as monoethanolamide and/or β-aminoalkanols, which are particularly advantageous in compositions with a pH of greater than 11, very particularly of greater than 11.7, as they help in reducing the formation of films and marks on hard surfaces (they can be employed in a proportion of 0.05 to 5% of the weight of the cleaning composition); solvent systems comprising monoethanolamide and/or β-aminoalkanols are disclosed in U.S. Pat. No. 5,108,660;
antifoaming agents, such as soaps in particular. Soaps are alkali metal salts of fatty acids, in particular sodium, potassium, ammonium and alkanolammonium salts of higher fatty acids comprising approximately from 8 to 24 carbon atoms and preferably from approximately 10 to approximately 20 carbon atoms; mention may in particular be made of mono-, di- and triethanolamine, sodium and potassium salts or mixtures of fatty acids derived from coconut oil and from ground walnut oil. The amount of soap can be at least 0.005% by weight, preferably from 0.5 to 2% by weight, with respect to the total weight of the composition. Additional examples of foam modifiers are organic solvents, hydrophobic silica, silicone oil and hydrocarbons;
abrasives, such as silica or calcium carbonate;
various additives, such as enzymes, fragrances, colorants, agents which inhibit corrosion of metals, preservatives, optical brighteners, opacifying or pearlescent agents, and the like.

The pH of the composition forming the subject matter of the invention or the pH of use of said composition can range from 0.5 to 14, preferably from 1 to 14.

Compositions of alkaline type, with a pH of greater than or equal to 7.5, preferably of greater than 8.5, for domestic applications (very particularly with a pH from 8.5 to 12, in particular from 8.5 to 11.5) are of particular use for the removal of greasy soiling substances and are particularly well suited to the cleaning of kitchens.

They can comprise from 0.001 to 5%, preferably from 0.005 to 2%, of their weight of the microgel.

The alkaline compositions generally comprise, in addition to the microgel, at least one additive chosen from
- a sequestering or scale-inhibiting agent (in an amount ranging from 0 to 40%, preferably from 1 to 40%, more preferably from 2 to 30% and very particularly from 5 to 20%, of the weight of the composition),
- a cationic biocide or disinfectant, in particular of quaternary ammonium type, such as (N-alkyl)benzyldimethylammonium chlorides, (N-alkyl)dimethyl(ethylbenzyl) ammonium chloride, N-didecyldimethylammonium halide and di(N-alkyl)dimethylammonium chloride (in an amount which can range from 0 to 60%, preferably from 0 to 40%, more preferably from 0 to 15% and very particularly from 0 to 5%, of the weight of the composition),
- at least one nonionic, amphoteric, zwitterionic or anionic surfactant or their mixture; when a cationic surfactant is present, said composition in addition preferably comprises an amphoteric and/or nonionic surfactant (the total amount of surfactants can range from 0 to 80%, preferably from 0 to 50%, very particularly from 0 to 35%, of the weight of the composition),
- if necessary, a pH modifier, in an amount which makes it possible to achieve, optionally after diluting or dissolving the composition, a pH of use ranging from 7.5 to 13; the pH modifier can in particular be a buffer system comprising monoethanolamine and/or a β-aminoalkanol and potentially but preferably "cobuffer" alkaline materials from the group consisting of aqueous ammonia, $C_2$-$C_4$ alkanolamines, silicates, borates, carbonates, bicarbonates, alkali metal hydroxides and their mixtures. The preferred cobuffers are alkali metal hydroxides.
- from 0.5 to 98%, preferably from 25 to 95%, very particularly from 45 to 90%, by weight of water,
- a cleaning or degreasing organic solvent, in an amount which can represent from 0 to 60%, preferably from 1 to 45%, very particularly from 2 to 15%, of the weight of said composition,
- a cosolvent, such as monoethanolamine and/or β-aminoalkanols, in an amount which may represent from 0 to 10%, preferably from 0.05 to 10%, very particularly from 0.05 to 5%, by weight of said composition,
- a water-soluble organic solvent with little cleaning effect, in an amount which can represent from 0 to 25%, preferably from 1 to 20%, very particularly from 2 to 15%, of the weight of said composition,
- optionally a bleaching agent, a fragrance or other conventional additives.

Said alkaline compositions can be provided in the form of a ready-for-use formulation or else of a dry or concentrated formulation to be diluted in water in particular before use; they can be diluted from 1- to 10 000-fold, preferably from 1- to 1000-fold, before use.

Advantageously, a formulation for cleaning kitchens comprises:
- from 0.001 to 1% by weight of the microgel,
- from 1 to 10% by weight of water-soluble solvent, in particular isopropanol,
- from 1 to 5% by weight of cleaning, or degreasing solvent, in particular butoxypropanol,
- from 0.1 to 2% by weight of monoethanolamine,
- from 0 to 5% by weight of at least one noncationic surfactant, preferably an amphoteric or nonionic surfactant,
- from 0 to 1% by weight of at least one cationic surfactant with a disinfecting property (in particular mixture of (n-alkyl)dimethyl(ethylbenzyl)ammonium chloride and (n-alkyl)dimethylbenzylammonium chloride),
the total amount of surfactant(s) representing from 1 to 50% by weight,
- from 0 to 2% by weight of a dicarboxylic acid as scale-inhibiting agent,
- from 0 to 5% of a bleaching agent,
- and from 70 to 98% by weight of water.

The pH of such a formulation is preferably from 7.5 to 13, more preferably from 8 to 12.

Compositions of acidic type, with a pH of less than 5, are of particular use for the removal of soiling substances of inorganic type; they are particularly well suited to the cleaning of toilet bowls.

They can comprise from 0.001 to 5%, preferably from 0.01 to 2%, of their weight of the microgel.

The acidic compositions generally comprise, in addition to the microgel,
- an inorganic or organic acidic agent (in an amount ranging from 0.1 to 40%, preferably from 0.5 to 20% and more preferably from 0.5 to 15%, of the weight of the composition),
- at least one nonionic, amphoteric, zwitterionic or anionic surfactant or their mixture (the total amount of surfactants can range from 0.5 to 20%, preferably from 0.5 to 10%, of the weight of the composition),
- optionally a cationic biocide or disinfectant, in particular of quaternary ammonium type such as (N-alkyl)benzyldimethylammonium chloride, (N-alkyl)dimethyl (ethylbenzyl)ammonium chloride, N-didecyldimethylammonium halide and di(N-alkyl)dimethylammonium chloride (in an amount which can range from 0.01 to 2%, preferably from 0.1 to 1%, of the weight of the composition),
- optionally a thickening agent (in an amount ranging from 0.1 to 3% of the weight of the composition),
- optionally a bleaching agent (in an amount ranging from 1 to 10% of the weight of the composition),
- from 0.5 to 99%, preferably from 50 to 98%, by weight of water,
- a solvent, such as glycol or an alcohol (in an amount which can range from 0 to 10%, preferably from 1 to 5%, of the weight of the composition),
- optionally a fragrance, a preservative, an abrasive or other conventional additives.

Said acidic compositions are preferably provided in the form of a ready-for-use formulation.

Advantageously, a formulation for cleaning toilet bowls comprises:
- from 0.05 to 5%, preferably from 0.01 to 2%, by weight of the microgel,
- an amount of acidic cleaning agent such that the final pH of the composition is from 0.5 to 4, preferably from 1 to 4; this amount is generally from 0.1 to approximately 40% and preferably between 0.5 and approximately 15% by weight, with respect to the weight of the composition; the acidic agent can be in particular an inorganic acid, such as phosphoric, sulfamic, hydrochloric, hydrofluoric, sulfuric, nitric or chromic acid and mixtures of these, an organic acid, in particular acetic, hydroxyacetic, adipic, citric, formic, fumaric, gluconic, glutaric, glycolic, malic, maleic, lactic, malonic, oxalic, succinic or tartaric acid and mixtures of these, or acid salts, such as sodium bisulfate, and mixtures of these; the preferred amount depends on the type of acidic cleaner used: for example, with sulfamic acid, it is between 0.2 and 10%, with hydrochloric acid between 1 and 15%, with citric acid between 2 and 15%, with formic acid between 5 and 15% and with phosphoric acid between 2 and 30%, by weight, from 0.5 to 10% by weight of at least one surfactant, preferably an anionic or nonionic surfactant, optionally from 0.1 to 2% by weight of at least one cationic surfactant with a disinfecting property (in particular mixture of (n-alkyl)dimethyl(ethylbenzyl)ammonium chloride and (n-alkyl)dimethylbenzylammonium chloride), optionally a thickening agent (in an amount ranging from 0.1 to 3% of the weight of the composition) of gum type, in particular a xanthan gum or a succinoglycan (Rheozan), optionally a bleaching agent (in an amount ranging from 1 to 10% of the weight of the composition), optionally a preservative, a colorant, a fragrance or an abrasive, and from 50 to 95% by weight of water.

A few other specific embodiments and forms of application of the composition of the invention are clarified below.

Thus, the composition according to the invention can be employed for making easier the cleaning treatment of glass surfaces, in particular of windows. This treatment can be carried out by the various known techniques. Mention may be made in particular of the techniques for cleaning windows by spraying with a jet of water using devices of the Kärcher® type.

The amount of microgel introduced will generally be such that, during the use of the cleaning composition, after optional dilution, the concentration of the microgel is between 0.001 g/l and 2 g/l, preferably between 0.005 g/l and 0.5 g/l.

The composition for cleaning windows according to the invention comprises:

from 0.001 to 10%, preferably 0.005 to 3%, by weight of the microgel;

from 0.005 to 20%, preferably from 0.5 to 10%, by weight of at least one nonionic surfactant (for example an amine oxide or an alkyl polyglucoside) and/or anionic surfactant; and the remainder being formed of water and/or of various additives which are conventional in the field.

The cleaning formulations for windows comprising said polymer can also comprise:

from 0 to 10%, advantageously from 0.5 to 5%, of amphoteric surfactant, from 0 to 30%, advantageously from 0.5 to 15%, of solvent, such as alcohols, the remainder being composed of water and of conventional additives (in particular fragrances).

The pH of the composition is advantageously between 6 and 11.

The composition of the invention is also advantageous for making easier the cleaning of dishes in an automatic device. Said composition can be either a detergent (cleaning) formulation used in the washing cycle or a rinsing formulation.

The detergent compositions for washing dishes in automatic dishwashers according to the invention advantageously comprise from 0.01 to 5%, preferably 0.1 to 3%, by weight of the microgel.

Said detergent compositions for dishwashers also comprise at least one surfactant, preferably a nonionic surfactant, in an amount which can range from 0.2 to 10%, preferably from 0.5 to 5%, of the weight of said detergent composition, the remainder being composed of various additives and of fillers, as already mentioned above.

Thus, they can additionally comprise up to 90% by weight of at least one detergency adjuvant (builder) of sodium tripolyphosphate or silicate type, up to 10%, preferably from 1 to 10%, very particularly from 2 to 8%, by weight of at least one auxiliary cleaning agent, preferably a copolymer of acrylic acid and of methylpropanesulfonic acid (AMPS), up to 30% by weight of at least one bleaching agent, preferably perborate or percarbonate, which may or may not be combined with a bleaching activator, up to 50% by weight of at least one filler, preferably sodium sulfate or sodium chloride.

The pH is advantageously between 8 and 13.

The compositions for making easier the rinsing of dishes in automatic dishwashers according to the invention can advantageously comprise from 0.02 to 10%, preferably from 0.1 to 5%, by weight of the microgel, with respect to the total weight of the composition. Said compositions can also comprise from 0.1 to 20%, preferably 0.2 to 15%, by weight, with respect to the total weight of said composition, of a surfactant, preferably a nonionic surfactant.

Mention may be made, among preferred nonionic surfactants, of surfactants of the following types: polyoxyethylenated $C_6$-$C_{12}$ alkylphenols, polyoxyethylenated and/or polyoxypropylenated $C_8$-$C_{22}$ aliphatic alcohols, ethylene oxide/propylene oxide block copolymers, optionally polyoxyethylenated carboxamides, and the like.

Said compositions can additionally comprise from 0 to 10%, preferably from 0.5 to 5%, by weight, with respect to the total weight of the composition, of a calcium-sequestering organic acid, preferably citric acid.

They can also comprise an auxiliary agent of copolymer of acrylic acid and of maleic anhydride or acrylic acid homopolymers type, in a proportion of 0 to 15%, preferably 0.5 to 10%, by weight, with respect to the total weight of said composition.

The pH is advantageously between 4 and 7.

Another subject of the invention is a cleaning composition for making easier the washing of dishes by hand.

Preferred detergent formulations of this type comprise from 0.1 to 10 parts by weight of the microgel per 100 parts by weight of said composition and comprise from 3 to 50, preferably from 10 to 40, parts by weight of at least one surfactant, preferably an anionic surfactant, chosen in particular from sulfates of saturated $C_5$-$C_{24}$, preferably $C_8$-$C_{16}$, aliphatic alcohols, optionally condensed with approximately from 0.5 to 30, preferably 0.5 to 8, very particularly 0.5 to 5, mol of ethylene oxide, in the acid form or in the form of a salt, in particular an alkali metal (sodium) salt, alkaline earth metal (calcium, magnesium) salt, and the like.

Preferably, they are lathering liquid aqueous detergent formulations for making easier the washing of dishes by hand.

Said formulations can additionally comprise other additives, in particular other surfactants, such as:

nonionic surfactants, such as amine oxides, alkylglucamides, alkyl polyglucosides, oxyalkylenated derivatives of fatty alcohols, alkylamides or alkanolamides, or amphoteric or zwitterionic surfactants, noncationic bactericides or disinfectants, such as triclosan, synthetic cationic polymers, polymers for controlling the viscosity of the mixture and/or the stability of the foams formed during use, hydrotropic agents, hydrating or moisturizing agents or agents for protecting the skin, colorants, fragrances, preservatives, divalent salts (in particular magnesium salts), and the like.

The pH of the composition is advantageously between 5 and 9.

Another specific embodiment of the invention is a composition for making easier the exterior cleaning, in particular of the bodywork, of motorized vehicles (automobiles, trucks, buses, trains, planes, and the like).

In this case also, the composition can be a cleaning composition proper or a rinsing composition.

The cleaning composition for motor vehicles advantageously comprises from 0.005 to 10% by weight of the microgel, with respect to the total weight of said composition, and:

nonionic surfactants (in a proportion of 0 to 30%, preferably of 0.1 to 15%, of the formulation), amphoteric and/or zwitterionic surfactants (in a proportion of 0 to 30%, preferably of 0.01 to 10%, of the formulation), cationic surfactants (in a proportion of 0 to 30%, preferably of 0.05 to 15%, of the formulation), anionic surfactants (in a proportion of 0 to 30%, preferably of 0.1 to 15%, of the formulation), detergency adjuvants (builders) (in a proportion of 1 to 99%, preferably of 40 to 98%, of the formulation), hydrotropic agents, fillers, pH modifiers, and the like.

The minimum amount of surfactant present in this type of composition is preferably at least 0.5% of the formulation.

The pH of the composition is advantageously between 8 and 13.

The composition of the invention is also particularly suitable for making easier the cleaning of hard surfaces of ceramic type (tiling, bath tubs, bathroom sinks, and the like), in particular for bathrooms.

The cleaning formulation advantageously comprises from 0.02 to 5% by weight of the microgel, with respect to the total weight of said composition, and at least one surfactant.

Preference is given, as surfactants, to nonionic surfactants, in particular the compounds produced by condensation of alkylene oxide groups of hydrophilic nature with a hydrophobic organic compound which can be of aliphatic or alkylaromatic nature.

The length of the hydrophilic chain or of the polyoxyalkylene radical condensed with any hydrophobic group can be readily adjusted in order to obtain a water-soluble compound having the desired degree of hydrophilic/hydrophobic balance (HLB).

The amount of nonionic surfactants in the composition of the invention can be from 0 to 30% by weight, preferably from 0 to 20% by weight.

An anionic surfactant can optionally be present in an amount of 0 to 30%, advantageously 0 to 20%, by weight.

It is also possible, but not essential, to add amphoteric, cationic or zwitterionic detergents.

The total amount of surface-active compounds employed in this type of composition is generally between 0.5 and 50%, preferably between 1 and 30%, by weight and more particularly between 2 and 20% by weight, with respect to the total weight of the composition.

Said cleaning composition can also comprise other minor ingredients, such as:

detergency adjuvants (builders) as mentioned above (in an amount which can be between 0.1 and 25% by weight, with respect to the total weight of the composition), a foam modifier as mentioned above, in particular of soap type (in an amount generally of at least 0.005% by weight, preferably of 0.5% to 2% by weight, with respect to the total weight of the composition), pH modifiers, colorants, optical brighteners, agents for suspending soiling substances, detergent enzymes, compatible bleaching agents, agents for controlling gel formation, freezing-thawing stabilizers, bactericides, preservatives, solvents, fungicides, insect repellants, hydrotropic agents, fragrances and opacifying or pearlescent agents.

The pH of the composition is advantageously between 2 and 12.

The composition according to the invention is also suitable for making easier the rinsing of shower walls. The aqueous compositions for rinsing shower walls comprise from 0.02% to 5% by weight, advantageously from 0.05 to 1%, of the microgel.

The other main active components of the aqueous compositions for rinsing showers of the present invention are at least one surfactant, present in an amount ranging from 0.5 to 5% by weight, and optionally a metal-chelating agent as mentioned above, present in an amount ranging from 0.01 to 5% by weight.

The aqueous compositions for rinsing showers advantageously comprise water with, optionally, a major proportion of at least one lower alcohol and a minor proportion of additives (between approximately 0.1 and approximately 5% by weight, more advantageously between approximately 0.5% and approximately 3% by weight and more preferably still between approximately 1% and approximately 2% by weight).

Some surfactants which can be used in this type of application are disclosed in U.S. Pat. Nos. 5,536,452 and 5,587,022, the content of which is incorporated by reference in the present description.

Preferred surfactants are polyethoxylated fatty esters, for example polyethoxylated sorbitan monooleates and polyethoxylated castor oil. Specific examples of such surfactants are the condensation products of 20 mol of ethylene oxide and of sorbitan monooleate (sold by Rhodia Inc. under the name Alkamuls PSMO-20® with an HLB of 15.0) and of 30 or 40 mol of ethylene oxide and of castor oil (sold by Rhodia Inc. under the names Alkamuls EL-620® (HLB of 12.0) and EL-719® (HLB of 13.6) respectively). The degree of ethoxylation is preferably sufficient to obtain a surfactant with an HLB of greater than 13.

The pH of the composition is advantageously between 7 and 11.

The composition according to the invention can also be employed for making easier the cleaning of glass-ceramic sheets.

Advantageously, the formulations for cleaning glass-ceramic sheets of the invention comprise:

0.01 to 5% by weight of the microgel, 0.1 to 1% by weight of a thickener, such as a xanthan gum, 10 to 60% by weight of an abrasive agent, such as calcium carbonate or silica;

0 to 7% by weight of a solvent, such as butyl diglycol, 1 to 10% by weight of a nonionic surfactant, and optionally basifying agents or sequestering agents.

The pH of the composition is advantageously between 7 and 12.

As mentioned above, the composition according to the invention can also be employed in the field of industrial cleaning, in particular for making easier the cleaning of reactors.

Advantageously, said compositions comprise:
from 0.02 to 5% by weight of the microgel,
from 1 to 50% by weight of alkali metal salts (sodium or potassium phosphates, carbonates, silicates),
from 1 to 30% by weight of a mixture of surfactants, in particular of nonionic surfactants, such as ethoxylated fatty alcohols, and anionic surfactants, such as laurylbenzenesulfonate,
from 0 to 30% by weight of a solvent, such as diisobutyl ether.

The pH of such a composition is generally from 8 to 14.

Another subject of the invention is the use, in a composition preferably comprising at least one surfactant, for modifying and/or treating hard surfaces, preferably for cleaning or rinsing hard surfaces in an aqueous or aqueous/alcoholic medium, of the microgel, for example as agent which makes it possible to contribute to said surfaces antideposition and/or antiadhesion properties with regard to soiling substances capable of being deposited on said surfaces.

Another subject of the invention is a method for treating and/or modifying hard surfaces, for improving the properties of compositions optionally comprising at least one surfactant, preferably for cleaning or rinsing hard surfaces in an aqueous or aqueous/alcoholic medium by addition to said compositions of the microgel.

Another subject of the invention is a method for treating and/or modifying hard surfaces, preferably for facilitating the cleaning or rinsing of hard surfaces by bringing said surfaces into contact with a composition in an aqueous or aqueous/alcoholic medium comprising the microgel and optionally at least one surfactant.

The microgel is preferably employed or is present in said composition in an amount which is effective in contributing to said surfaces antideposition and/or antiadhesion properties with regard to soiling substances capable of being deposited on said surfaces.

The nature and the amounts of the microgel present or employed in said composition, as well as the other additives and various forms of application of said composition, have already been mentioned above.

Other details or advantages of the invention will become apparent in view of the nonlimiting examples that follow.

EXAMPLES

Example 1

Preparation of Microgels

Three architectures of microgels were synthesized:
1/ C-branches$_{block}$ microgels having branches of identical chemical nature, each comprising a neutral hydrophilic polyacrylamide block and a filled hydrophilic poly(ethyl acrylate of trimethylammonium methyl sulfate) block. These microgels were synthesized by the "core first" method, which consisted in synthesizing a crosslinked core having a living character, onto which the branches were polymerized.

2/ C-branches$_{MIKTO}$ microgels having branches of different chemical nature, comprising a neutral hydrophilic polyacrylamide branch and a filled hydrophilic poly(ethyl acrylate of trimethylammonium methyl sulfate) branch. These stars were synthesized by the "arm first" method, which consisted in synthesizing the branches containing a living end, onto which a crosslinked core was then polymerized.

3/ Core C microgels.

In the examples given below, the polymerization reactions were carried out under a slight purge of argon in simple glass equipment submerged in an oil bath preheated to 70° C. As free-radical generators, 4,4'-azobis(4-cyanopentanoic acid) (ACP) or sodium persulfate ($Na_2S_2O_8$) were used. The crosslinker used in the following examples was N,N'-methylenebisacrylamide (MBA). By way of example, the cationic monomer used below was the ethyl acrylate of trimethylammonium methyl sulfate (ADAMQUAT), in all the syntheses below an 80 wt % solution of ADAMQUAT in water was used. The neutral hydrophilic monomer used below was acrylamide (AM), and for reasons of toxicity it was handled as aqueous solutions.

The conversion of the first generation polymer was evaluated by analyses of the (co)polymers by size exclusion chromatography (SEC), or by gas chromatography (GC) of the residual monomers, or by high-performance liquid chromatography (HPLC). The number-average molecular weights $M_n$ (g/mol) were expressed as polyethylene oxide equivalents. The molecular weight distribution was evaluated by the polydispersity index ($I_p$) corresponding to the ratio of the weight-average molecular weight to the number-average molecular weight ($I_p=M_w/M_n$).

These examples showed that the number-average molecular weight of the first generation polymers derived from the radical polymerization of ethylenically unsaturated monomers was principally determined by the initial molar ratio of the monomer to the control agent. UV detection at 290 nm in SEC chromatography indicated the presence of the fragment of control agent at the end of the polymer chains, characteristic of the controlled nature of the polymerization.

Abbreviations
AA=acrylic acid;
ADAMQUAT=ethyl acrylate of trimethylammonium methyl sulfate;
AM=acrylamide;
MBA=N,N'-methylenebisacrylamide;
Xant=xanthate of type: $EtOC(=S)SCH(CH_3)COOCH_3$; and
ACP=4,4'-azobis(4-cyanopentanoic acid).

Example 1.1

Preparation of an AM/MBA Core C Microgel

In a two-necked round-bottomed flask topped with a condenser, 9.64 g (46.28×10$^{-3}$ mol) of xanthate $EtOC(=S)SCH(CH_3)COOCH_3$ were added to 50 g of ethanol. The reaction mixture was brought to 70° C. At this temperature, 1.927 g (6.87×10$^{-3}$ mol) of ACP were added in one go. Next, a mixture of 13.42 g (188.77×10$^{-3}$ mol) of AM, 4.28 g (27.78×10$^{-3}$ mol) of MBA, 100.54 g of deionized water and 57.39 g of ethanol was added continuously over 3 h. At the end of the continuous addition, the heating was continued for 2 h before introducing, in one go, the last fraction of initiator (ACP) 1.445 g (5.158×10$^{-3}$ mol). The heating was continued for a further 5 h.

Example 1.2

Preparation of a C-Branches$_{block}$ Microgel Having Cationic Diblock Branches by a "Core First" Route (AM/MBA Core)-(AM$_{5k}$-ADAMQUAT$_{10k}$)

In a two-necked round-bottomed flask topped with a condenser, 20 g of the "C2" solution from example 1.1 were heated at 70° C. At this temperature, a mixture of 40.24 g (566.10×10⁻³ mol) of AM (i.e. 82.12 g of the 49 wt % solution in water), 0.230 g (0.822×10⁻³ mol) of ACP and 38.88 g of deionized water was added over a period of 2 h 30 min. The heating was continued for an additional 2 h 30 min before 0.115 g (0.411×10⁻³ mol) of ACP was added. The heating was continued for a further 4 h.

A certain amount of the solution obtained was withdrawn so as to only keep 50 g of the reaction medium in the two-necked flask, to which was added, still at 70° C., a mixture of 7.38 g (27.42×10⁻³ mol) of ADAMQUAT (i.e. 7.384 g of the 80 wt % solution in water), 0.108 g (0.385×10⁻³ mol) of ACP and 18.84 g of deionized water over a period of 2 h. The heating was maintained for an additional 5 h before 0.086 g (0.308×10⁻³ mol) of ACP was added. The heating was continued for a further 4 h.

Example 1.3

Preparation of a C-Branches$_{MIKTO}$ Microgel Having Cationic Mikto Branches by an "Arm First" Route Mikto AM$_{5k}$-C-ADAMQUAT$_{5k}$ 03MBN052

Step A: Synthesis of P(AM)-5K: 03MBN48

In a two-necked round-bottomed flask topped with a condenser, 1.458 g (7.0×10⁻³ mol) of xanthate EtOC(=S)SCH(CH$_3$)COOCH$_3$ were added to 50.0 g (703.43×10⁻³ mol) of AM (i.e. 166.67 g of a 30 wt % solution of AM in the water), and to a mixture comprising 31.35 g of ethanol and 8.71 g of deionized water. The reaction mixture was then heated to 70° C. At this temperature, 0.392 g (1.40×10⁻³ mol) of ACP in 2 ml of ethanol was added dropwise over 30 min. After heating for 4 hours at 70° C., 0.392 g (1.40×10⁻³ mol) of ACP was added in one go. The heating was then continued for an additional 4 h.

$M_n$=5630 g/mol; $M_w/M_n$=1.43.

Step B: Synthesis of P(ADAMQUAT)-5K: 03MBN06

In a two-necked round-bottomed flask topped with a condenser, 2.08 g (10.0×10⁻³ mol) of xanthate EtOC(=S)SCH(CH$_3$)COOCH$_3$ were added to 50 g (185.65×10⁻³ mol) of ADAMQUAT (i.e. 62.50 g of the 80 wt % solution in water), and to a mixture comprising 24.73 g of ethanol and 86.43 g of deionized water. The reaction mixture was then heated to 70° C. At this temperature 0.456 g (2.00×10⁻³ mol) of ammonium peroxodisulfate (Na$_2$S$_2$O$_8$) was added in one go. After heating for 4 hours at 70° C., 0.456 g (2.00×10⁻³ mol) of ammonium peroxodisulfate (Na$_2$S$_2$O$_8$) was added in one go. The heating was then maintained for an additional 4 h.

$M_n$=5459 g/mol; $M_w/M_n$=1.28.

Step C: In a two-necked round-bottomed flask topped with a condenser, 8.929 g of the synthetic crude P(AM)-5K solution, 8.333 g of the synthetic crude P(ADAMQUAT)-5K solution and 32.74 g of deionized water were mixed. This mixture was heated to 70° C. At this temperature, a mixture of 1.340 g (18.848×10⁻³ mol) of AM (i.e. 4.4657 g of a 30 wt % solution of AM in water), MBA (see table below for the amounts) and 0.050 g (0.179×10⁻³ mol) of ACP in ethanol (see table 1 for the amounts) was added over a period of 2 h. The heating was maintained for an additional 2 h before 0.050 g (0.179×10⁻³ mol) of ACP was added. The heating was continued for a further 5 h.

| Name | MBA weight (g) | MBA n (mmol) | EtOH weight (g) |
|---|---|---|---|
| 03MBN52 | 1.238 | 8.038 | 20.974 |

Example 1.4

Preparation of a Blend of Two Linear Acrylamide AM$_{5k}$ and PolyADAMQUAT$_{5k}$ Polymers 03MBN049

In a two-necked round-bottomed flask topped with a condenser, 8.929 g of the synthetic crude P(AM)-5K solution (step A from example 1.4), 8.333 g of the synthetic crude P(ADAMQUAT)-5K solution (step B from example 1.4) and 32.74 g of deionized water were mixed. This mixture was heated to 70° C. At this temperature, a mixture of 1.340 g (18.848×10⁻³ mol) of AM (i.e. 4.4657 g of a 30 wt % solution of AM in water), MBA (see table below for the amounts) and 0.050 g (0.179×10⁻³ mol) of ACP in ethanol (see table 1 for the amounts) was added over a period of 2 h. The heating was maintained for an additional 2 h before 0.050 g (0.179×10⁻³ mol) of ACP were added. The heating was continued for a further 5 h.

| Name | MBA weight (g) | MBA n (mmol) | EtOH weight (g) |
|---|---|---|---|
| 03MBN49 | 0 | 0 | 9.833 |

Example 2

Evaluations 2.1 Adsorption on a Model Surface

A composition was prepared that comprised:
  distilled water;
  50 ppm by weight of the microgel from example 1.2;
  pH of 6 (by addition of hydrochloric acid or NaOH); and
  10⁻³ M KCl;
The adsorption kinetics of the microgel of the composition onto an oxidized silica wafer (surface similar to a glass or ceramic surface, available from Silicon Inc., under the description "100 mm Silicon Wafers, single side polished, P-type (100) orientation, thickness 500-550 microns, with 1000 (±3%) Angstroms SiO$_2$ applied, clean room processed and packaged") were monitored by reflectometry. It was carried out by comparison using a reference comprising distilled water and 10⁻³M KCl, according to the method below:
The technique was based on the reflection of light: a polarized ray of an He—Ne laser (632.8 nm) penetrated into a cell through a glass prism along Brewster's angle at the water/silicon interface (71°) on a silicon wafer covered with a thin film of the adsorbent support to be studied. The ray was reflected and then separated into two components (perpendicular Is and parallel Ip) then recovered by photodiodes. The quantity recorded during the adsorption was ΔS=S−So in volts. So is the value of S=Ip/Is solely in the presence of the solvent in the cell with the substrate. The measurement was carried out at the point known as the "stagnation point". At this point, no flow exists in order to avoid a coupling between the mechanism for transport of the molecule and its arrangement at the surface. The flow of the solution of polymer to be studied is taken in the cell solely by the difference in level; it must be laminar of the order of 2 ml/min. To calculate the adsorbed amount $\Gamma$, it is necessary to determine the sensitivity factor As using an optical model. This factor depends on the wavelength of the laser, the angle of incidence, the thickness of the adsorbent and the refractive indices of the solvent and of the surface. The adsorbed amount $\Gamma$ in mg/m$^2$ can then be deduced therefrom by the equation $\Gamma=(1/As)$ $(\Delta S/So)$ $(As=0.1711 \times dn/dc=0.1711 \times 0.17=0.029)$.

Results:

A rapid adsorption was observed, with a plateau after 4 minutes at 0.9 mg/m$^2$ of adsorbed microgel.

The resistance of the adsorption to rinsing was tested: the adsorbed microgel withstood rinsing (rinsing with a solution comprising distilled water and $10^{-3}$ M KCl).

2.2 Treatment/Modification of a Glass Surface

Compositions were prepared comprising:
  distilled water;
  50 ppm by weight of the microgel from example 1.2; and
  pH of 6.
Comparative compositions were prepared comprising:
  water;
  50 or 200 ppm of a comparative copolymer: ampholytic random linear copolymer comprising units that derived from acrylic acid and cationic units such as described in document WO 01/05920; and
  pH of 8.

Treatment/modification of surfaces. 10 cm×15 cm glass plates were used. The plates were washed with a 10% Decon 90 alkaline solution. Next, they were rinsed with tap water and then with distilled water. They were wiped with absorbent paper (Kimberly-Clark Kimtech precision wipers) and the above compositions were sprayed on. The plates were again wiped with the absorbent, paper and were left to dry for around 30 minutes.

The contact angle of a drop of distilled water was measured using a goniometer (Rame-Hart Inc. NRL C.A. Goniometer, Model No. 100-00-230), before and after the above treatment/modification. The difference (initial–final) was reported and also the final value. A large value for the difference indicated significant hydrophilization (reduced contact angle). A low value for the final value indicated a significant hydrophilic character.

| | Conditions | | |
|---|---|---|---|
| | 50 ppm of the microgel pH 6 | 200 pm of the comparative copolymer pH 8 | 50 ppm of the comparative copolymer pH 6 |
| Difference | 8.6° ± 3° | 10.2° ± 3° | No significant effect |
| Final value | Less than 10° | Around 10-12° | / |

Example 3

Cleaning of Bathroom Surfaces

The following compositions were prepared:

| | Example | | | |
|---|---|---|---|---|
| | 3.1 | 3.2 | 3.3 (comparative) | 3.4 (comparative) Reference |
| Carrier | Distilled water | Distilled water | Distilled water | Distilled water |
| Surfactant: Synperonic A7, Uniqema | 0.5% | 0.5% | 0.5% | 0.5% |
| Additive tested | 50 ppm of the microgel from example 1.2 | 200 ppm of the microgel from example 1.2 | 250 ppm of a comparative copolymer* | |
| pH (by addition, if necessary, of citric acid or citrate) | 4 | 4 | 4 | 4 |

*Mirapol Surf S 210, sold by Rhodia (amount expressed by weight of polymer active agent of the commercial product)

The modification of the surface using the compositions was evaluated by:
  a) application of a stain characteristic of a bathroom to ceramic tiles;
  b) application of the composition, cleaning and drying (evaluation of the appearance of the surface after cleaning);
  c) application of a new stain characteristic of a bathroom; and
  d) further cleaning and drying (evaluation of the appearance of the surface after cleaning).

Thorough hydrophilization (no traces of droplets on drying) and new improved or facilitated cleaning were observed for the compositions from examples 3.1, 3.2 and 3.3 (in comparison with the composition from example 3.4). The additives according to the invention especially made it possible to obtain significant effects with small amounts.

Example 4

Cleaning of Toilet Surfaces

The aqueous compositions below were prepared (amounts in wt %):

The following compositions were prepared:

| | Example | | | |
|---|---|---|---|---|
| | 4.1 | 4.2 | 4.3 (comparative) | 4.4 (comparative) Reference |
| Carrier | Distilled water | Distilled water | Distilled water | Distilled water |
| Surfactant: Synperonic A7, Uniqema | 0.5% | 0.5% | 0.5% | 0.5% |
| Additive tested | 50 ppm of the microgel from example 1.2 | 200 ppm of the microgel from example 1.2 | 250 ppm of a comparative copolymer* | |

-continued

| | Example | | | |
|---|---|---|---|---|
| | 4.1 | 4.2 | 4.3 (comparative) | 4.4 (comparative) Reference |
| pH (by addition, if necessary, of citric acid or citrate) | 3 | 3 | 3 | 3 |

*Mirapol Surf S 500, sold by Rhodia (amount expressed by weight of polymer active agent of the commercial product)

The modification of the surface using the compositions was evaluated by:
a) cleaning and drying of black ceramic tiles (cleaned with ethanol and deionized water then wiped with dry paper and dried for one hour);
b) application of the composition to the black ceramic tiles (3 ml using a pipette covering the entire surface, without wiping, and drying for one hour horizontally);
c) application of a stain characteristics of toilets (25 g of the below stain, using a film drawer), and drying for 12 hours horizontally;
d) rinsing, (using a flexible tube for 1 minute with tap water at 1 L/10 seconds, tube diameter: 0.5 cm, 20 cycles back and forth);
e) evaluation of the appearance of the surface (image analysis, scoring: the higher the score, the better it is);
f) application of a new stain characteristic of toilets, and drying;
g) further rinsing; and
h) evaluation of the appearance of the surface (image analysis, scoring).

Composition of the Stain:
In a plastic beaker, the following was mixed with an ultraturax mixer:

| Raw material | REFERENCES | wt % |
|---|---|---|
| Cellulose gel | CAS #: 51395-75-6 Supplier: FMC Type: AVICEL, RC-581F | 2.857% |
| Cholesterol 95% | CAS #: 57-88-5 Supplier: ALDRICH | 1.428% |
| Sunflower oil | Trade name: Fruit D'or, 1st refined pressing | 0.357% |
| Colza oil | | 0.357% |
| Iron phosphate tetrahydrate | CAS #: 31096-47-6 Supplier: ALDRICH | 1.071% |
| Tricalcium phosphate | CAS #: 12167-74-7 Supplier: Rhodia (Cranbury) Type: NF Grade - Food Grade | 1.071% |
| EXCIPIENT to 100%: deionized water | | 92.86% |

The results were the following:

| Example | Evaluation after 1st rinsing | Evaluation after 2nd rinsing |
|---|---|---|
| 4.3 (comparative) | 4.8 | 4.6 |
| 4.1 | 4.9 | 4.8 |
| 4.2 | 4.9 | 4.8 |

Thorough hydrophilization (no traces of droplets on drying) and improved or facilitated cleaning were observed for the compositions from examples 4.1 and 4.2 (in comparison with the composition from example 4.3). This effect lasted after at least one rinsing. The additives according to the invention especially made it possible to obtain significant effects with low amounts.

Example 5

Cleaning of Kitchen Surfaces

The following compositions were prepared:

| | Example | | |
|---|---|---|---|
| | 5.1 | 5.2 | 5.3 (comparative) Reference |
| Carrier | Distilled water | Distilled water | Distilled water |
| Surfactant: Synperonic A7, Uniqema | 0 | 0 | 0 |
| Additive tested | 50 ppm of the microgel from example 1.2 | 200 ppm of the microgel from example 1.2 | |

* Mirapol Surf S 100, sold by Rhodia (amount expressed by weight of polymer active agent of the commercial product)

The modification of the surface using the compositions was evaluated by:

a) application of the composition to ceramic tiles and drying;

b) application of a stain characteristic of kitchens, and drying;

c) rinsing; and d) visual evaluation of the appearance of the surface.

Thorough hydrophilization (no traces of droplets on drying) and improved or facilitated cleaning were observed for the compositions from examples 5.1 and 5.2 (in comparison with the composition from example 5.3). The additives according to the invention especially made it possible to obtain significant effects with small amounts.

Example 6

Modification of Surfaces—Droplet Trail Test

The following compositions were prepared:

| | Example | | | | |
|---|---|---|---|---|---|
| | 6.1 | 6.2 | 6.3 | 6.5 comparative | 6.6 comparative |
| Carrier | Distilled water | Distilled water | Distilled water | Distilled water | Distilled water |
| Additive tested | 50 ppm of the microgel from example 1.1 | 50 ppm of the microgel from example 1.2 | 50 ppm of the microgel from example 1.3 | 50 ppm of the mixture of polymers from example 1.4 | 200 ppm of a comparative copolymer* |
| pH | 6 | 6 | 6 | 6 | 6 |

*Ampholytic random linear copolymer comprising units that derive from acrylic acid and cationic units such as described in document WO 01/05920

A droplet trail test was carried out (a droplet was made to run over a vertical surface and the width of the trail was observed at one point as a function of the time), according to the following procedure:

a) Treatment of the Glass Plate:

10 cm×15 cm glass plates were used. The plates were washed with a 10% solution of Decon 90. Next, they were rinsed with tap water and then with distilled water. They were wiped with absorbent paper (Kimberly-Clark Kimtech precision wipers) and the composition to be studied was sprayed on. It was again wiped with absorbent paper and left to dry for around 30 minutes.

b) Droplet Trail:

The plate was positioned vertically. Droplets of distilled water were placed successively in a line, over the upper part of the glass plate, using a pipette. Red and green light made it possible to visualize the outline of the water film. By sliding, the droplet leaves behind it a film of water which spreads out as a function of the wetting allowed by the substrate, and which drains as the film is vertical: the water runs. A camera recorded the flow of the droplets.

Using image treatment software, the width of the droplet trail was monitored at a given height, over time. This width gives a general idea of the wettability of the surface: the higher its value is, the more hydrophilic the surface is.

The width of the droplet (in pixels) as a function of time (average over several droplets, in seconds) for the various compositions is reported in FIG. I.

It can be seen that the compositions according to the invention exhibit a hydrophilic property and/or hydrophilization. The additives according to the invention especially make it possible to obtain significant effects with small amounts.

Example 7

Cleaning Dishes (Automatic Dishwasher)

Glasses were washed in a dishwasher using a commercial product, to which the polymer to be tested was added.

Two defects were evaluated visually:
presence of spots on the glasses; and
presence of a dull continuous film (deposit) on the glasses.

| | Example | | | |
|---|---|---|---|---|
| | 7.1 | 7.2 | 7.3 (comparative) | 7.4 (comparative) |
| Additive tested | 50 ppm of the microgel from example 1.2 | 200 ppm of the microgel from example 1.2 | 200 ppm of a comparative copolymer* | 200 ppm of a comparative copolymer* |
| Result | Correct | Correct | Correct | Insufficient |

*Mirapol Surf S 410, sold by Rhodia (amount expressed by weight of polymer active agent of the commercial product)

The additives according to the invention especially made it possible to obtain significant effects with small amounts.

Examples 3, 4, 5 and 7 especially show that the microgels according to the invention have a high modularity, since one and the same microgel can procure advantageous effects in several types of formulations and/or for several different applications for treating hard surfaces.

The invention claimed is:

1. A composition for treating and/or modifying hard surfaces, comprising a synthetic microgel polymer which comprises:
   a chemically crosslinked polymeric core comprising structural units C that derive from a core monomer C and crosslinking structural units R that derive from a crosslinking monomer R; and
   optionally, macromolecular branches at the periphery of the core, and
   a surfactant.

2. The composition as defined by claim 1, said microgel polymer having been prepared by controlled radical polymerization.

3. The composition as defined by claim 1, said microgel polymer comprising cationic or potentially cationic structural units or zwitterionic structural units.

4. The composition as defined by claim 1, wherein the core structural units C comprise:
   cationic or potentially cationic structural units $C_{cat}$ or zwitterionic structural units $C_z$;
   anionic or potentially anionic structural units $C_A$; or
   hydrophilic or hydrophobic neutral structural units $C_N$.

5. The composition as defined by claim 1, wherein the crosslinking structural units R are derived from a diethylenically unsaturated monomer $R_{difunct}$.

6. The composition as defined by claim 1, wherein the microgel has a core C that does not contain macromolecular branches at the periphery of the core, obtained by controlled radical polymerization, and which comprises a blend of the following monomers:
   at least one core monomer C comprising a single polymerizable functional group; and
   at least one crosslinking monomer R comprising at least two polymerizable functional groups.

7. The composition as defined by claim 1, wherein the molar ratio of the core monomer C to the crosslinking monomer R is greater than or equal to 1.

8. The composition as defined by claim 1, wherein:
   the core C is obtained by controlled radical polymerization employing a precursor control or transfer agent;
   the crosslinking monomer R is a diethylenically unsaturated monomer $R_{difunct}$; and
   the theoretical coefficient for generation of branches r is greater than or equal to 0.25.

9. The composition as defined by claim 1, wherein the microgel is a C-branches microgel comprising macromolecular branches at the periphery of the core, selected from among the following microgels:

C-branches$_{Homo}$, wherein each branch is of identical chemical nature, comprising at least 90 mol % of identical units;

C-branches$_{block}$, wherein each branch is of identical chemical nature, each comprising at least one block A comprising structural units A and at least one block B comprising structural units B, the block B being different from the block A;

C-branches$_{rand}$ wherein each branch is of identical chemical nature, each comprising less than 90 mol % of structural units A and less than 90 mol % of structural units B different from structural units A, distributed randomly or in a gradient; and C-branches$_{MIKTO}$, comprising at least one branch A comprising structural units A, and at least one branch B comprising structural units B different from structural units A, the branch A and the branch B being different in chemical nature.

10. The composition as defined by claim 9, wherein the microgel is obtained by an "arm first" process or a "core first" process.

11. The composition as defined by claim 9, wherein the microgel is a C-branches$_{block}$ microgel wherein:
the block A is a hydrophilic intermediate block bonded to the core or at least partly included in the core; and
the block B is a peripheral block bonded to the block A, comprising cationic or potentially cationic structural units $B_{cat}$ or zwitterionic structural units $B_z$.

12. The composition as defined by claim 11, wherein:
the core C comprises core structural units C that are neutral and hydrophilic structural units $C_{Nphile}$;
the intermediate block A comprises neutral hydrophilic structural units $A_{Nphile}$; and
the peripheral block B comprises cationic or potentially cationic structural units $B_{cat}$ or zwitterionic structural units $B_z$.

13. The composition as defined by claim 9, wherein the microgel comprises a C-branches$_{block}$ microgel wherein:
the block A is an intermediate block bonded to the core or at least partly included in the core, comprising cationic or potentially cationic structural units $A_{cat}$ or zwitterionic structural units $A_z$; and
the block B is a hydrophilic peripheral block bonded to the block A.

14. The composition as defined by claim 13, wherein:
the core comprises core structural units C that are neutral hydrophilic structural units $C_{Nphile}$;
the intermediate block A comprises cationic or potentially cationic structural units $A_{cat}$; and
the peripheral block B comprises neutral hydrophilic structural units $B_{Nphile}$.

15. The composition as defined by claim 9, wherein the microgel is a C-branches$_{MIKTO}$ microgel wherein:
the branches A are hydrophilic branches; and
the branches B comprise cationic or potentially cationic structural units $B_{cat}$ or zwitterionic structural units $B_z$.

16. The composition as defined by claim 15, wherein:
the core comprises core structural units C that are neutral hydrophilic structural units $C_{Nphile}$;
the branches A comprise neutral hydrophilic structural units $A_{Nphile}$; and
the branches B comprise cationic or potentially cationic structural units $B_{cat}$ or zwitterionic structural units $B_z$.

17. The composition as defined by claim 9, wherein the microgel is a C-branches$_{rand}$ microgel wherein the branches comprise:
anionic or potentially anionic structural units $A_A$ and/or hydrophilic or hydrophobic neutral structural units $A_N$; and
cationic or potentially cationic structural units $B_{cat}$ or zwitterionic structural units $B_z$.

18. The composition as defined by claim 17, wherein:
the core comprises core structural units C that are neutral hydrophilic structural units $C_{Nphile}$;
the branches comprise:
anionic or potentially anionic structural units $A_A$;
cationic structural units $B_{cat}$; and
potentially cationic structural units $B_{cat}$ and/or hydrophilic neutral structural units $B_{Nphile}$.

19. The composition as defined by claim 1, wherein:
the microgel comprises cationic or potentially cationic structural units $A_{cat}$ and/or $B_{cat}$ and/or $C_{cat}$; and
the cationic or potentially cationic structural units $A_{cat}$ or $B_{cat}$ or Ccat are structural units derived from monomers selected from among the following monomers:
N,N-dimethylaminomethyl acrylamide or methacrylamide;
2-(N,N-dimethylamino)ethyl acrylamide or methacrylamide;
3-(N,N-dimethylamino)propyl acrylamide or methacrylamide;
4-(N,N-dimethylamino)butyl acrylamide or methacrylamide;
2-(dimethylamino)ethyl acrylate (ADAM);
2-(dimethylamino)ethyl methacrylate (DMAM or MADAM);
3-(dimethylamino)propyl methacrylate;
2-(tert-butylamino)ethyl methacrylate;
2-(dipentylamino)ethyl methacrylate;
2-(diethylamino)ethyl methacrylate;
vinylpyridines;
vinylamine;
vinylimidazolines;
trimethylammonium propylmethacrylate chloride;
trimethylammonium ethylacrylamide chloride or bromide;
trimethylammonium methacrylamide chloride or bromide;
trimethylammonium butylacrylamide methyl sulfate;
trimethylammonium methacrylamide methyl sulfate;
trimethylammonium propylmethacrylamide methyl sulfate (MAPTA MeS);
(3-methacrylamidopropyl)trimethylammonium chloride (MAPTAC);
(3-acrylamidopropyl)trimethylammonium chloride (APTAC);
(methacryloyloxyethyl)trimethylammonium chloride or methyl sulfate;
salts of (acryloyloxyethyl)trimethylammonium (ADAM-QUAT);
1-ethyl-2-vinylpyridinium bromide, chloride or methyl sulfate,
1-ethyl-4-vinylpyridinium bromide, chloride or methyl sulfate;
N,N-dimethyldiallylammonium chloride (DADMAC);
dimethylaminopropylmethacrylamide, and
N-(3-chloro-2-hydroxypropyl)trimethylammonium chloride (DIQUAT).

20. The composition as defined by claim 1, wherein:
the microgel comprises hydrophilic or hydrophobic neutral structural units $A_N$ and/or $B_N$ and/or $C_N$; and these units are neutral hydrophilic structural units $A_{Nphile}$ and/or $B_{Nphile}$ and/or $C_{Nphile}$ derived from monomers selected from among the following monomers:

hydroxyethyl acrylates and methacrylates, acrylamide, methacrylamide; and vinyl alcohol.

21. The composition as defined by claim 1, wherein:

the microgel comprises anionic or potentially anionic structural units $A_A$ and/or $C_A$; and these units are units derived from monomers selected from among the following monomers:

acrylic acid, methacrylic acid, maleic acid or anhydride, and water-soluble salts thereof; and 2-sulfooxyethyl methacrylate, vinylbenzenesulfonic acid, allylsulfonic acid, 2-acrylamido-2-methylpropanesulfonic acid, sulfoethyl acrylate or methacrylate, sulfopropyl acrylate or methacrylate and water-soluble salts thereof.

22. The composition as defined by claim 21, wherein:

the microgel comprises:

cationic or potentially cationic structural units $A_{cat}$ and/or $B_{cat}$ and/or $C_{cat}$;

neutral hydrophilic structural units $A_{Nphile}$ and/or $B_{Nphile}$ and/or $C_{Nphile}$; and the weight ratio of the cationic or potentially cationic structural units to the neutral hydrophilic structural units is greater than or equal to 1.

23. The composition as defined by claim 9, wherein:

the weight ratio of the structural units B to the structural units A is greater than or equal to 1.

24. The composition as defined by claim 1, wherein the surfactant is selected from among anionic surfactants, amphoteric surfactants, cationic surfactants, neutral surfactants, and mixtures or combinations thereof.

25. The composition as defined by claim 1, wherein the microgel comprises from 0.001 to 10% by weight thereof.

26. The composition as defined by claim 1, wherein the surfactant or surfactants constitute from 0.005 to 60% by weight thereof.

27. The composition as defined by claim 1, further comprising at least one additive selected from the group consisting of chelating agents, sequestering or scale-inhibiting agents, inorganic detergency adjuvants (builders), bleaching agents, fillers, bleaching catalysts, agents which influence pH, polymers capable of controlling the viscosity of the mixture and/or the stability of foams, hydrotropic agents, hydrating or moisturizing agents, biocides or disinfectants, solvents with a cleaning or degreasing activity, industrial cleaners, water-soluble organic solvents with little cleaning effect, cosolvents, antifoaming agents, abrasives, enzymes, fragrances, colorants or agents which inhibit the corrosion of metals.

28. The composition as defined by claim 1, useful for the cleaning or rinsing of hard surfaces made of ceramic, glass, metal, synthetic resin or plastic.

29. The composition as defined by claim 1, useful for the cleaning or rinsing of the bathroom, the kitchen, floors made of linoleum, tiling or cement, toilet bowls, windows or mirrors, or dishes, by hand or in a machine.

30. The composition as defined by claim 1, useful for the cleaning or rinsing of reactors, steel blades, sinks, tanks, dishes, exterior or interior surfaces of buildings, windows of buildings, including apartment buildings, or bottles.

31. The composition as defined by claim 1, having a pH of at least 7.5 and comprising from 0.001 to 5% by weight of the microgel.

32. The composition as defined by claim 1, further comprising at least one additive selected from the group consisting of sequestering or scale-inhibiting agents, cationic biocides or disinfectants, surfactants, pH regulators, water, cleaning or degreasing organic solvents, cosolvents, water-soluble organic solvents with little cleaning effect, bleaching agents and fragrances.

33. The composition as defined by claim 1, comprising:

from 0.001 to 1% by weight of the microgel, from 1 to 10% by weight of water-soluble solvent, from 1 to 5% by weight of cleaning or degreasing solvent, from 0.1 to 2% by weight of monoethanolamine, from 0 to 5% by weight of at least one noncationic surfactant, from 0 to 1% by weight of at least one cationic surfactant having a disinfecting property or mixture of (n-alkyl)dimethyl(ethylbenzyl)ammonium chloride and (n-alkyl)dimethylbenzylammonium chloride), the total amount of surfactant(s) constituting from 1 to 50% by weight thereof, from 0 to 2% by weight of a dicarboxylic acid as scale-inhibiting agent, from 0 to 5% of a bleaching agent, and from 70 to 98% by weight of water, and having a pH ranging from 7.5 to 13.

34. A composition comprising a synthetic microgel polymer which comprises:

a chemically crosslinked polymeric core comprising structural units C that derive from a core monomer C and crosslinking structural units R that derive from a crosslinking monomer R; and optionally, macromolecular branches at the periphery of the core, said composition having a pH of less than 5 and comprising an inorganic or organic acidic agent and from 0.001 to 5% by weight of microgel.

35. The composition as defined by claim 34, further comprising at least one additive selected from the group consisting of nonionic, amphoteric, zwitterionic or anionic surfactants or their mixtures, cationic biocides or disinfectants, thickening agents, bleaching agents, water, solvents, fragrances or abrasives.

36. The composition as defined by claim 1, comprising:

from 0.05 to 5% by weight of microgel, from 0.1 to approximately 40% by weight of at least one acidic cleaning agent, from 0.5 to 10% by weight of at least one surfactant, optionally, from 0.1 to 2% by weight of at least one cationic surfactant having a disinfecting property or a mixture of (n-alkyl)dimethyl(ethylbenzyl)ammonium chloride and of (n-alkyl)dimethylbenzylammonium chloride, optionally, from 0.1 to 3% by weight of at least one thickening agent, optionally, from 1 to 10% by weight of at least one bleaching agent, preservative, colorant, fragrance or abrasive, and from 50 to 95% by weight of water, and having a pH of 0.5 to 4.

37. The composition as defined by claim 1, comprising:

from 0.001 to 10% by weight of microgel, from 0.005 to 20% by weight of at least one nonionic and/or anionic surfactant, from 0 to 10% by weight of at least one amphoteric surfactant, water, from 0 to 30% by weight of at least one solvent, and having a pH of 6 to 11.

38. The composition as defined by claim 1, comprising:
from 0.01 to 5% by weight of microgel,
from 0.2 to 10% by weight of at least one surfactant, and optionally,
up to 90% by weight of at least one detergency adjuvant (builder),
up to 10% by weight of at least one auxiliary cleaning agent or a copolymer of acrylic acid and of methylpropanesulfonic acid,
up to 30% by weight of at least one bleaching agent, which may or may not be combined with a bleaching activator,
up to 50% by weight of at least one filler, having a pH of 8 to 13.

39. The composition as defined by claim 1, comprising:
from 0.02 to 10% by weight of microgel,
from 0.1 to 20% by weight of at least one surfactant,
from 0 to 10% by weight of at least one calcium-sequestering organic acid,
from 0 to 15% by weight of at least one auxiliary detergency agent, and having a pH of 4 to 7.

40. The composition as defined by claim 1, comprising:
from 0.1 to 10% by weight of microgel,
from 3 to 50% by weight of at least one surfactant, and optionally,
at least one nonionic surfactant,
at least one noncationic bactericide or disinfectant,
at least one synthetic cationic polymer agent,
at least one polymer capable of controlling the viscosity of the mixture and/or the stability of the foams,
at least one hydrotropic agent,
at least one hydrating or moisturizing agent or agent for protecting the skin, and having a pH of 5 to 9.

41. The composition as defined by claim 1, comprising:
from 0.005 to 10% by weight of microgel,
from 0 to 30% by weight of at least one nonionic surfactant,
from 0 to 30% by weight of at least one anionic surfactant,
from 0 to 30% by weight of at least one amphoteric and/or zwitterionic surfactant,
from 0 to 30% by weight of at least one cationic surfactant, the minimum amount of surfactant being at least 0.5% by weight,
from 0 to 99% by weight of at least one detergency adjuvant (builder),
optionally, a hydrotropic agent, fillers or pH regulators, and having a pH of 8 to 13.

42. The composition as defined by claim 1, comprising:
from 0.02 to 5% by weight of microgel,
from 0 to 30% by weight of at least one nonionic surfactant,
from 0 to 30% by weight of at least one anionic surfactant, the total amount of surfactant constituting from 0.5 to 50% by weight thereof,
from 0 to 25% by weight of at least one detergency adjuvant (builder), and
from 0 to 2% by weight of a foam regulator, and having a pH of 2 to 12.

43. The composition as defined by claim 1, comprising:
from 0.02 to 5% by weight of microgel,
from 0.5 to 5% by weight of at least one nonionic surfactant,
water,
optionally, at least one lower alcohol,
optionally, from 0.01 to 5% by weight of at least one metal-chelating agent, and having a pH of 7 to 11.

44. The composition as defined by claim 1, comprising:
from 0.01 to 5% by weight of microgel,
from 0.1 to 1% by weight of at least one thickening agent,
from 10 to 60% by weight of at least one abrasive agent,
from 1 to 10% by weight of at least one nonionic surfactant,
from 0 to 7% by weight of at least one solvent,
optionally, basifying or sequestering agents, and having a pH of 7 to 12.

45. The composition as defined by claim 1, comprising:
from 0.02 to 5% by weight of microgel,
from 1 to 50% by weight of at least one alkali metal salt,
from 1 to 30% by weight of a mixture of surfactants,
from 0 to 30% by weight of at least one solvent, and having a pH of 8 to 14.

46. A method for treating and/or modifying hard surfaces, comprising applying thereon and subsequently rinsing therefrom, the composition as defined by claim 1.

47. The method as defined by claim 46, comprising:
hydrophilizing said hard surfaces; and
cleaning said hard surfaces.

48. The method as defined by claim 46, comprising providing anti-deposition and/or anti-adhesion properties with regard to soiling substances which can be deposited on said surfaces.

\* \* \* \* \*